US010452345B1

(12) United States Patent
Coburn, IV et al.

(10) Patent No.: US 10,452,345 B1
(45) Date of Patent: Oct. 22, 2019

(54) MEDIA PLAYBACK SYSTEM WITH VIRTUAL LINE-IN

(71) Applicant: Sonos, Inc., Santa Barbara, CA (US)

(72) Inventors: Arthur L. Coburn, IV, Lexington, MA (US); Chris Kotowski, Boston, MA (US)

(73) Assignee: Sonos, Inc., Santa Barbara, CA (US)

( * ) Notice: Subject to any disclaimer, the term of this patent is extended or adjusted under 35 U.S.C. 154(b) by 0 days.

(21) Appl. No.: 16/119,516

(22) Filed: Aug. 31, 2018

Related U.S. Application Data

(60) Provisional application No. 62/672,020, filed on May 15, 2018.

(51) Int. Cl.
  *G06F 17/00* (2019.01)
  *G06F 3/16* (2006.01)
  *G05B 15/02* (2006.01)

(52) U.S. Cl.
  CPC ............. *G06F 3/165* (2013.01); *G05B 15/02* (2013.01); *G06F 3/162* (2013.01)

(58) Field of Classification Search
  CPC .................................. G06F 3/162; G06F 3/165
  See application file for complete search history.

(56) References Cited

U.S. PATENT DOCUMENTS

| 5,440,644 A | 8/1995 | Farinelli et al. |
| 5,761,320 A | 6/1998 | Farinelli et al. |
| 5,923,902 A | 7/1999 | Inagaki |
| 6,032,202 A | 2/2000 | Lea et al. |
| 6,256,554 B1 | 7/2001 | DiLorenzo |
| 6,404,811 B1 | 6/2002 | Cvetko et al. |
| 6,469,633 B1 | 10/2002 | Wachter et al. |

(Continued)

FOREIGN PATENT DOCUMENTS

| EP | 1389853 A1 | 2/2004 |
| WO | 200153994 | 7/2001 |
| WO | 2003093950 A2 | 11/2003 |

OTHER PUBLICATIONS

AudioTron Quick Start Guide, Version 1.0, Mar. 2001, 24 pages.
AudioTron Reference Manual, Version 3.0, May 2002, 70 pages.
AudioTron Setup Guide, Version 3.0, May 2002, 38 pages.

(Continued)

*Primary Examiner* — Joseph Saunders, Jr.
(74) *Attorney, Agent, or Firm* — McDonnell Boehnen Hulbert & Berghoff LLP

(57) ABSTRACT

Example systems and techniques disclosed herein facilitate interoperability between different media playback systems referred to herein as a virtual line-in (VLI) media playback system and a native playback system. When a VLI session is created by a VLI sender, a first native playback device can join a VLI group as a VLI receiver. As a VLI receiver, the first native playback device receives audio content and playback commands from the VLI sender to facilitate synchronous playback with other VLI receivers. At the same time, this native playback device can concurrently operate as a native domain group coordinator of a native domain synchrony group. As the native domain group coordinator, the native playback device translates VLI domain audio, control, and timing signals into the native domain and distributes such signals to native domain group members. In this way, the native domain group members can synchronize their playback with the VLI group.

20 Claims, 16 Drawing Sheets

(56) References Cited

U.S. PATENT DOCUMENTS

| | | |
|---|---|---|
| 6,522,886 B1 | 2/2003 | Youngs et al. |
| 6,611,537 B1 | 8/2003 | Edens et al. |
| 6,631,410 B1 | 10/2003 | Kowalski et al. |
| 6,757,517 B2 | 6/2004 | Chang |
| 6,778,869 B2 | 8/2004 | Champion |
| 7,127,537 B2 * | 10/2006 | Schreiber ............... H04H 60/04 710/65 |
| 7,130,608 B2 | 10/2006 | Hollstrom et al. |
| 7,130,616 B2 | 10/2006 | Janik |
| 7,143,939 B2 | 12/2006 | Henzerling |
| 7,236,773 B2 | 6/2007 | Thomas |
| 7,295,548 B2 | 11/2007 | Blank et al. |
| 7,391,791 B2 | 6/2008 | Balassanian et al. |
| 7,483,538 B2 | 1/2009 | McCarty et al. |
| 7,571,014 B1 | 8/2009 | Lambourne et al. |
| 7,630,501 B2 | 12/2009 | Blank et al. |
| 7,643,894 B2 | 1/2010 | Braithwaite et al. |
| 7,657,910 B1 | 2/2010 | McAulay et al. |
| 7,853,341 B2 | 12/2010 | McCarty et al. |
| 7,987,294 B2 | 7/2011 | Bryce et al. |
| 8,014,423 B2 | 9/2011 | Thaler et al. |
| 8,045,952 B2 | 10/2011 | Qureshey et al. |
| 8,103,009 B2 | 1/2012 | McCarty et al. |
| 8,234,395 B2 | 7/2012 | Millington et al. |
| 8,483,853 B1 | 7/2013 | Lambourne et al. |
| 8,942,252 B2 | 1/2015 | Balassanian et al. |
| 2001/0042107 A1 | 11/2001 | Palm |
| 2002/0022453 A1 | 2/2002 | Balog et al. |
| 2002/0026442 A1 | 2/2002 | Lipscomb et al. |
| 2002/0124097 A1 | 9/2002 | Isely et al. |
| 2003/0157951 A1 | 8/2003 | Hasty |
| 2004/0024478 A1 | 2/2004 | Hans et al. |
| 2007/0142944 A1 | 6/2007 | Goldberg et al. |
| 2009/0204842 A1 * | 8/2009 | Tetik ......................... G06F 1/12 713/400 |
| 2016/0321028 A1 * | 11/2016 | Doerbecker .......... G10L 21/055 |
| 2017/0286051 A1 * | 10/2017 | Mendes .................. G06F 3/165 |
| 2017/0289231 A1 * | 10/2017 | Powell ................. H04N 21/643 |

OTHER PUBLICATIONS

Bluetooth. "Specification of the Bluetooth System: The ad hoc SCATTERNET for affordable and highly functional wireless connectivity," Core, Version 1.0 A, Jul. 26, 1999, 1068 pages.

Bluetooth. "Specification of the Bluetooth System: Wireless connections made easy," Core, Version 1.0 B, Dec. 1, 1999, 1076 pages.

Dell, Inc. "Dell Digital Audio Receiver: Reference Guide," Jun. 2000, 70 pages.

Dell, Inc. "Start Here," Jun. 2000, 2 pages.

"Denon 2003-2004 Product Catalog," Denon, 2003-2004, 44 pages.

Jo et al., "Synchronized One-to-many Media Streaming with Adaptive Playout Control," Proceedings of SPIE, 2002, pp. 71-82, vol. 4861.

Jones, Stephen, "Dell Digital Audio Receiver: Digital upgrade for your analog stereo," Analog Stereo, Jun. 24, 2000 retrieved Jun. 18, 2014, 2 pages.

Louderback, Jim, "Affordable Audio Receiver Furnishes Homes With MP3," TechTV Vault. Jun. 28, 2000 retrieved Jul. 10, 2014, 2 pages.

Palm, Inc., "Handbook for the Palm VII Handheld," May 2000, 311 pages.

Presentations at WinHEC 2000, May 2000, 138 pages.

United States Patent and Trademark Office, Provisional U.S. Appl. No. 60/490,768, filed Jul. 28, 2003, entitled "Method for synchronizing audio playback between multiple networked devices," 13 pages.

United States Patent and Trademark Office, Provisional U.S. Appl. No. 60/825,407 filed Sep. 12, 2006, entitled "Controlling and manipulating groupings in a multi-zone music or media system," 82 pages.

UPnP; "Universal Plug and Play Device Architecture," Jun. 8, 2000; version 1.0; Microsoft Corporation; pp. 1-54.

Yamaha DME 64 Owner's Manual; copyright 2004, 80 pages.

Yamaha DME Designer 3.5 setup manual guide; copyright 2004, 16 pages.

Yamaha DME Designer 3.5 User Manual; Copyright 2004, 507 pages.

* cited by examiner

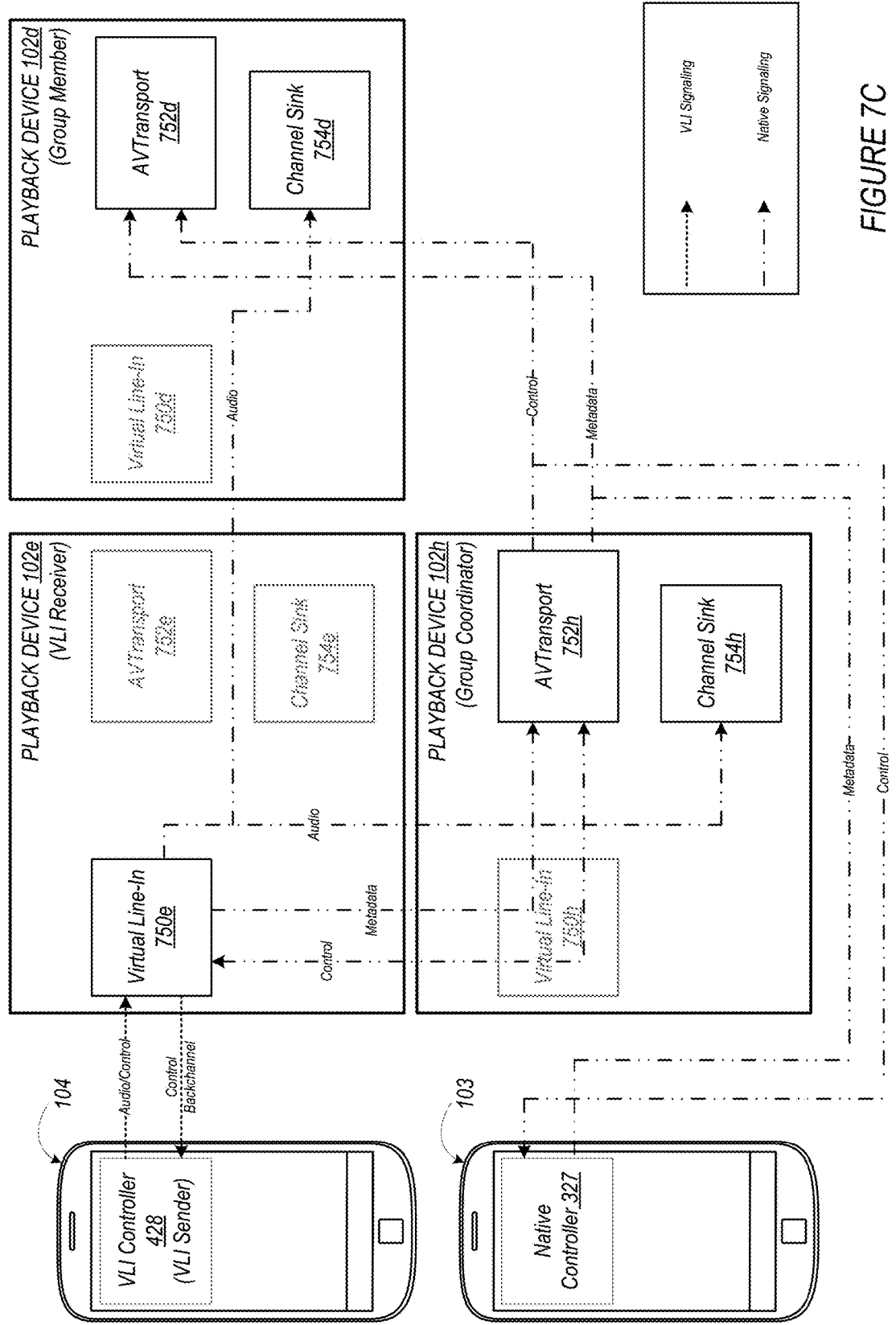

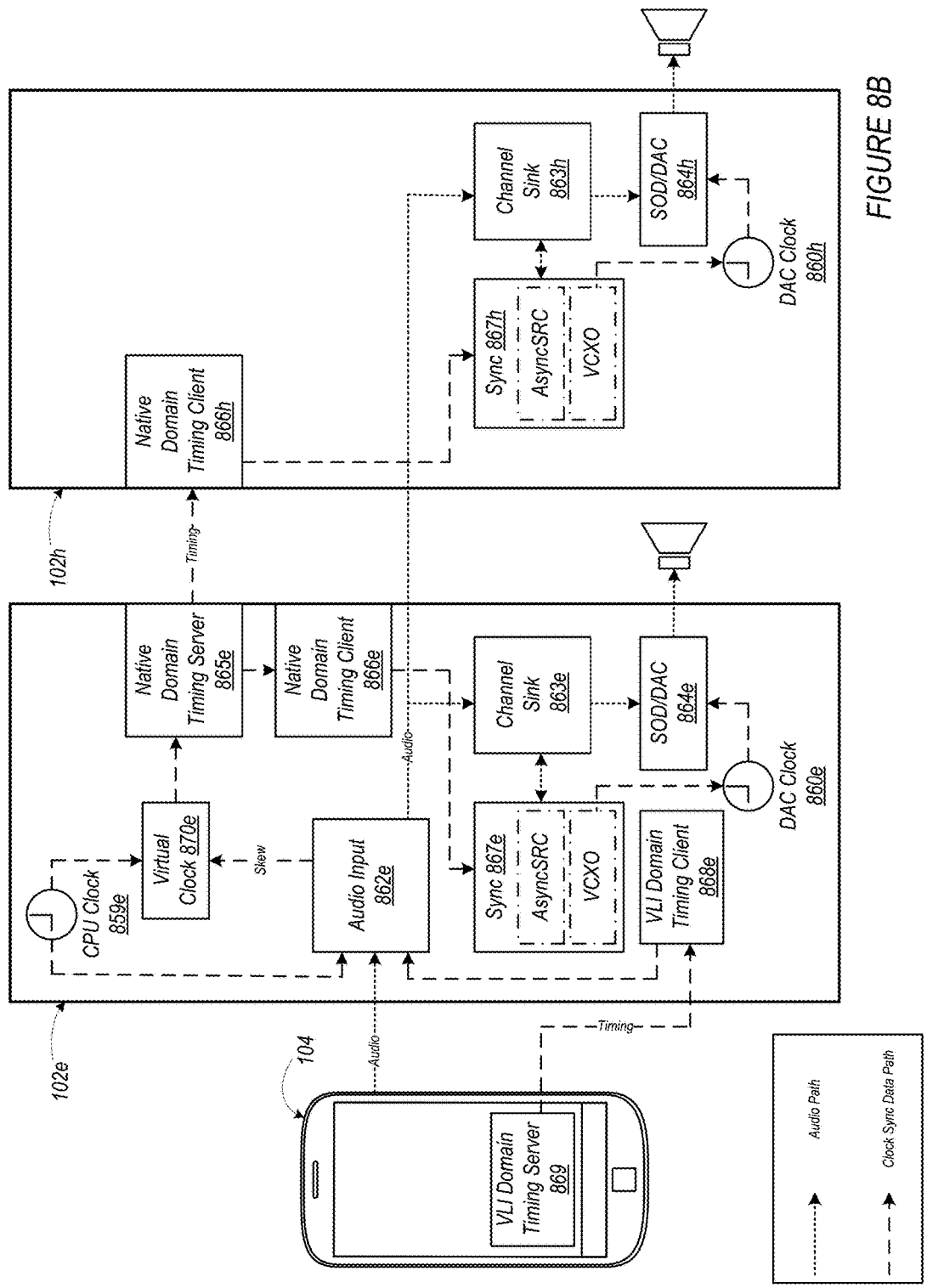

MEDIA PLAYBACK SYSTEM WITH VIRTUAL LINE-IN

CROSS REFERENCE TO RELATED APPLICATIONS

This application claims the benefit under 35 U.S.C. § 119 of U.S. provisional App. No. 62/672,020 filed on May 15, 2018, entitled "Media Playback System with Virtual Line-In," which is incorporated herein by reference in its entirety.

FIELD OF THE DISCLOSURE

The disclosure is related to consumer goods and, more particularly, to methods, systems, products, features, services, and other elements directed to media playback or some aspect thereof.

BACKGROUND

Options for accessing and listening to digital audio in an out-loud setting were limited until in 2003, when SONOS, Inc. filed for one of its first patent applications, entitled "Method for Synchronizing Audio Playback between Multiple Networked Devices," and began offering a media playback system for sale in 2005. The Sonos Wireless HiFi System enables people to experience music from many sources via one or more networked playback devices. Through a software control application installed on a smartphone, tablet, or computer, one can play what he or she wants in any room that has a networked playback device. Additionally, using the controller, for example, different songs can be streamed to each room with a playback device, rooms can be grouped together for synchronous playback, or the same song can be heard in all rooms synchronously.

Given the ever growing interest in digital media, there continues to be a need to develop consumer-accessible technologies to further enhance the listening experience.

BRIEF DESCRIPTION OF THE DRAWINGS

Features, aspects, and advantages of the presently disclosed technology may be better understood with regard to the following description, appended claims, and accompanying drawings where:

FIGS. 7A, 7B, 7C, and 7D are example functional block diagrams corresponding to example virtual line-in configurations in accordance with aspects of the disclosure;

FIGS. 8A, 8B, and 8C are example functional block diagrams corresponding to example virtual line-in timing configurations in accordance with aspects of the disclosure.

Figure 1:
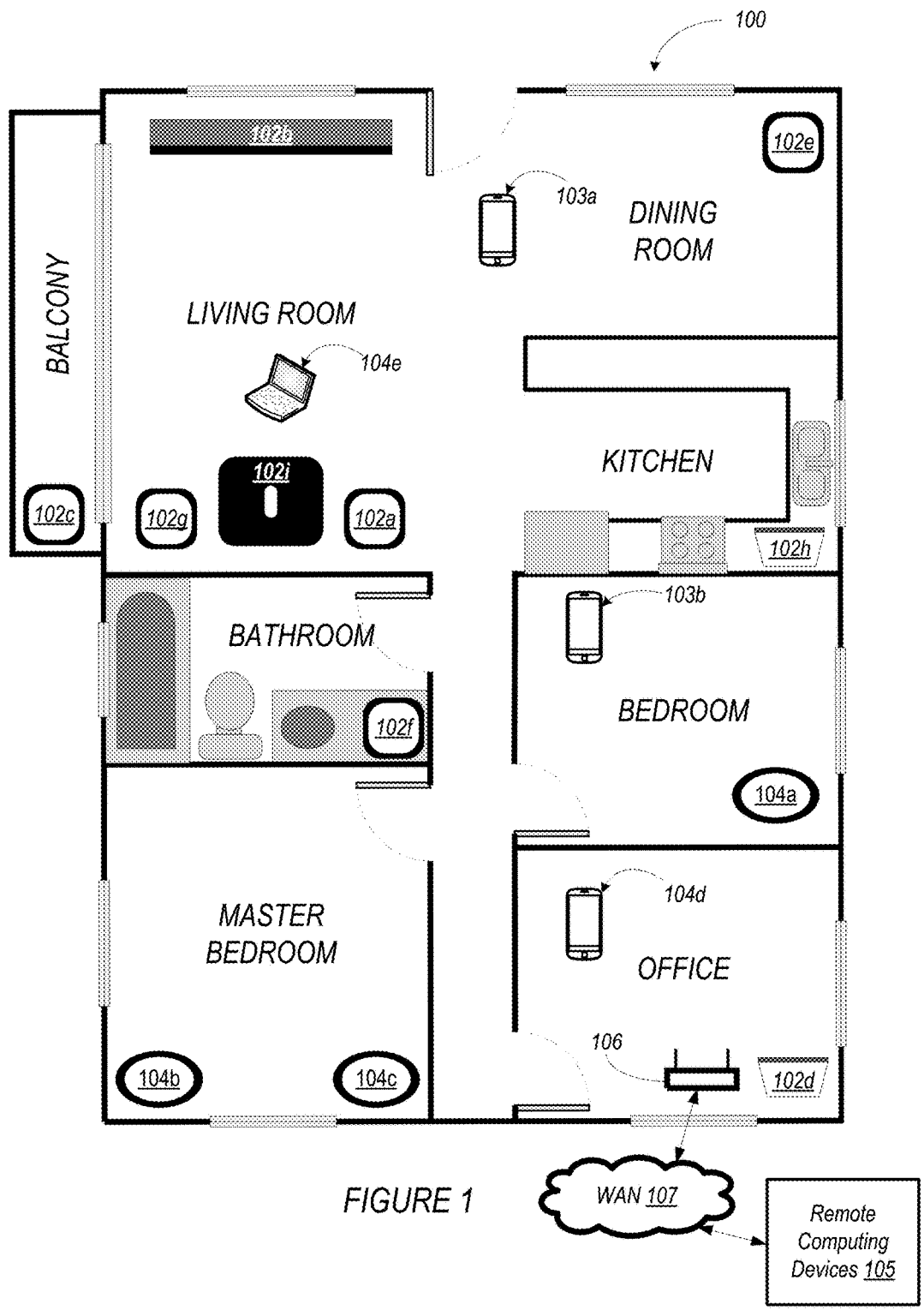
FIG. 1 shows an example media playback system configuration in which certain embodiments may be practiced.

The drawings are for the purpose of illustrating example embodiments, but it is understood that the inventions are not limited to the arrangements and instrumentality shown in the drawings.

DETAILED DESCRIPTION

I. Overview

Example systems and techniques disclosed herein facilitate interoperability between different media playback systems. While playback devices of different media playback systems may implement some similar features, such playback devices might not be compatible with one another. For instance, while playback devices of respective media playback systems may each support forming playback groups with playback devices of the same media playback system, playback devices of different media playback systems may be unable to form playback groups with one another. Such incompatibility may be inherent as different media playback systems may implement similar features in different ways. Yet, some users may benefit from interoperability between devices of different media playback systems.

Within examples, to enable interoperability between a first media playback system and a second media playback system, the first media playback system may implement a virtual line-in to interface with the second media playback system. The second media playback system, which may be a third-party media playback system (i.e. a media playback system produced by a different manufacturer than the first media playback system, which may be referred to as a first-party media playback system), may make certain information available via an application programming interface. Such information may include control and timing signals, as well as the content itself. However, in various examples disclosed herein, such control and timing signals are provided by the second media playback system in forms used by the second media playback system, which are different from forms utilized by the first media playback system. Forms used by the second media playback system are referred to herein as VLI domain (e.g., VLI timing domain, VLI control domain, etc.) while forms used by the first media playback system are referred to herein as native domain (e.g., native timing domain, native control domain, etc.)

Yet, in examples in which information in this VLI domain is the only information made available by the second media playback system, the first media playback system is dependent upon this VLI domain information to enable interoperability. That is, the first media playback system cannot force the second media playback system to operate in the native domain of the first media playback system, but must instead adapt to the VLI domain of the second media playback system. In one aspect, the first media playback system may treat the VLI domain information provided by the second media playback system as an audio source, or virtual line-in. In various embodiments described below, the VLI domain information may include information from an analog or digital audio signal similar to that received via a more traditional line-in interface, but further includes, e.g., timing information for synchronizing playback and/or other operations between the first and the second playback systems and/or control information.

For example, to synchronize playback among multiple playback devices in a synchrony group, the first media playback system may designate a particular playback device of the synchrony group as a group coordinator. The group coordinator distributes native domain playback and timing information with the other playback devices of the synchrony group (i.e., the group members). The group members match their respective native domain clocks (either physically or logically) to the clock of the group coordinator to facilitate synchronous playback.

The second media playback system may also have a feature of synchronous playback among multiple playback devices in a synchrony group, but implement this feature in a different way. For instance, the VLI timing domain of the second media playback system might use a different protocol (such as real-time transport protocol (RTP) or precision time protocol (PTP)) than the native timing domain of the first media playback system (which might use simplified network time protocol (SNTP), among others). As such, the second media playback system might only make available timing information in a domain that is different from the timing domain used by the first media playback system. These distinct timing domains are inherently not synchronized with one another.

In accordance with embodiments of the disclosure, to facilitate interoperability, one or more playback devices of the first media playback system may adopt the VLI timing domain of the second media playback system in a way that enables the creation of a VLI synchrony group. For instance, if the second media playback system uses PTP, these playback devices of the first media playback system may join the hierarchical master-slave architecture of that protocol as implemented within the second playback device by implementing PTP servers and/or clients (i.e., VLI domain timing servers/clients). For example, in some cases, these playback devices of the first media playback may each implement a PTP server and receive timing information from a PTP server on a PTP master within the second media playback system. Alternatively, a particular playback device of the first media playback system may operate as the PTP master (or more generally, "a timing master") of a VLI group. Yet, to retain compatibility with other playback devices of the first media playback system, these playback devices concurrently maintain one or more clocks in the native timing domain, which may be matched (either physically or logically) to the VLI time domain.

Within examples, each media playback system may utilize one or more control interfaces for controlling playback and other functions of the playback devices in the first and second respective systems. For instance, the first media playback system may implement playback control via a native controller application or "native controller" (i.e., a software controller) running on a smartphone, tablet, or PC, which exchanges native domain control signaling with playback devices of the first media playback system via a network. Likewise, a VLI controller application or "VLI controller" (i.e., a software controller) on one or more devices of the second media playback system may control playback by the devices of the second media playback system. Each controller may present a graphical user interface on one or more displays with various playback controls such as transport controls (e.g., play, pause, and skip forward and backward), volume controls, and media library controls, among other examples to facilitate control of playback by the various devices of each system. Moreover, example playback devices of the first and/or second media playback systems may include their own respective control interfaces (e.g., a playback device may include physical transport controls on its housing).

To create a VLI group, a user may select one or more playback devices of the first and/or second media playback systems using a VLI control interface on a given VLI device. Example VLI control interfaces include a graphical user interface (GUI) of a VLI controller displayed on a VLI device or a voice user interface (VUI) implemented using microphones on a VLI device. Upon selecting one or more playback devices of the first and/or second media playback systems, a VLI session is created. The given VLI device that created the VLI group and initiated the VLI session becomes the "VLI sender," which provides audio and control information to playback devices of the first media playback system which are in the VLI group. These playback devices are referred to as VLI receivers. While operating as the "source of truth" within the VLI group for audio and control information, the VLI sender is not necessarily the "source of truth" for timing information within the VLI group.

Generally, during a VLI session (when the VLI receiver(s) are treating the VLI sender as a virtual line-in), VLI domain control commands received via a control interface of the VLI sender are passed through the virtual line-in and transmitted to each VLI receiver of the VLI group. In addition, audio is sourced by the VLI sender (either from storage on the device or from a network location) and distributed to each of the VLI receivers.

The playback and control devices of the first media playback system retain their native domain audio and control signaling concurrently with the VLI signaling. In various embodiments, maintaining native domain signaling enables devices of the first media playback system that are not within the VLI group to interact with devices of the first media playback system that are within the VLI group. In some instances, concurrent VLI and native domain signaling enables compatibility of VLI receivers with certain devices of the first media playback system that might not support becoming VLI receivers or handling VLI signaling, such as legacy devices, which might have hardware incompatibilities.

In some examples, limited two-way control originating within the native control domain, which may be referred to as "backchannel control," is possible. The extent of this backchannel control may be generally restricted or limited by the control functions available over the API of the second media playback system. For instance, the second media playback system may publish API functions corresponding to transport controls, such as play, pause, skip forward, skip backward, etc. When a native domain transport control command is received via a native domain control interface on the VLI receiver, the VLI receiver converts the native domain transport control command to a VLI domain transport control and transmits the VLI domain transport control back to the VLI sender. If a native domain transport control command is received via a native domain control interface on a native domain control device or group member, the native domain transport control command is transmitted to the VLI receiver, which converts the native domain transport control command to a VLI domain transport control and transmits the VLI domain transport control back to the VLI sender. In this manner, native domain control may be at least partially retained during a VLI session.

As noted above, example techniques may involve a virtual line-in. Each of these example implementations may be embodied as a method, a device configured to carry out the implementation, a system of devices configured to carry out the implementation, or a non-transitory computer-readable medium containing instructions that are executable by one or more processors to carry out the implementation, among other examples. It will be understood by one of ordinary skill in the art that this disclosure includes numerous other embodiments, including combinations of the example features described herein. Further, any example operation described as being performed by a given device to illustrate a technique may be performed by any suitable devices, including the devices described herein. Yet further, any device may cause another device to perform any of the operations described herein.

While some examples described herein may refer to functions performed by given actors such as "users" and/or other entities, it should be understood that this description is for purposes of explanation only. The claims should not be interpreted to require action by any such example actor unless explicitly required by the language of the claims themselves.

Moreover, some functions are described herein as being performed "based on" or "in response to" another element or function. "Based on" should be understood that one element or function is related to another function or element. "In response to" should be understood that one element or function is a necessary result of another function or element. For the sake of brevity, functions are generally described as being based on another function when a functional link exists; however, such disclosure should be understood as disclosing either type of functional relationship.

II. Example Operating Environment

FIG. 1 illustrates an example configuration of a system 100 in which one or more embodiments disclosed herein may be implemented. The system 100 as shown is associated with an example home environment having several rooms and spaces, such as for example, an office, a dining room, and a living room. Within these rooms and spaces, the system 100 includes two media playback systems, referred to herein as a native media playback system and a VLI media playback system. The native media playback system includes playback devices 102 (identified individually as playback devices 102a-102i), and control devices 103a and 103b (collectively "control devices 103"). The VLI media playback system includes VLI devices 104 (identified individually as VLI devices 104a-104e), each of which may include control and/or playback functionality. In some embodiments, one or more of the VLI devices, such as mobile and laptop devices 104d and 104e can be configured to concurrently run software of a VLI controller and software for a native controller, which enables users to select between different control interfaces using the same device.

Referring now to the native media playback system, the various playback devices 102 and other network devices, such as one or more of the control devices 103 configured to run the native API software, of the native media playback system may be coupled to one another via point-to-point connections and/or over other connections, which may be wired and/or wireless, via a LAN including a network router 106. For example, the playback device 102g (designated as "Left") may have a point-to-point connection with the playback device 102a (designated as "Right"). In one embodiment, the Left playback device 102g may communicate over the point-to-point connection with the Right playback device 102a. In a related embodiment, the Left playback device 102g may communicate with other network devices via the point-to-point connection and/or other connections via the LAN.

The network router 106 may be coupled to one or more remote computing device(s) 105 via a wide area network (WAN) 107. In some embodiments, the remote computing device(s) 105 may be cloud servers. The remote computing device(s) 105 may be configured to interact with the system 100 in various ways. For example, the remote computing device(s) may be configured to facilitate streaming and controlling playback of media content, such as audio, in the home environment, perhaps as part of providing a streaming audio service via WAN 107. In some examples, the remote computing device(s) 105 may be representative of cloud servers from multiple services, perhaps operated by different entities.

Further aspects relating to the different components of the example system 100 and how the different components may interact to provide a user with a media experience may be found in the following sections. While discussions herein may generally refer to the example system 100, technologies described herein are not limited to applications within, among other things, the home environment as shown in FIG. 1. For instance, the technologies described herein may be useful in other home environment configurations comprising more or fewer of any of the playback and/or control devices of the native media playback system. In addition, the technologies described herein may be useful in other home environment configurations comprising more or fewer of any of the VLI devices 104 of the VLI media playback system. Additionally, the technologies described herein may be useful in environments where multi-zone audio may be desired, such as, for example, a commercial setting like a restaurant, mall or airport, a vehicle like a sports utility vehicle (SUV), bus or car, a ship or boat, an airplane, and so on.

a. Example Playback Devices

Figure 2:
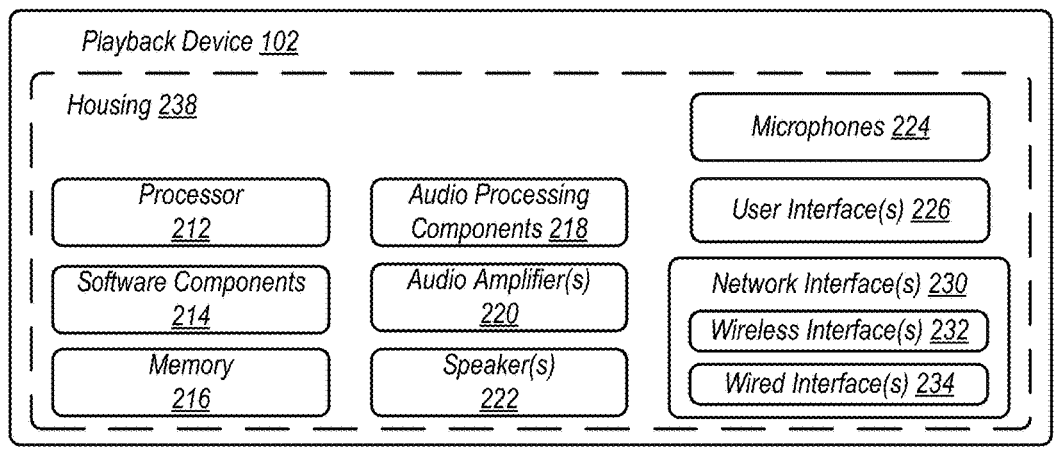
FIG. 2 shows a functional block diagram of an example playback device in accordance with aspects of the disclosure.

FIG. 2 is a functional block diagram illustrating certain aspects of a selected one of the playback devices 102 shown in FIG. 1. As shown, such a playback device may include a processor 212, software components 214, memory 216, audio processing components 218, audio amplifier(s) 220, speaker(s) 222, microphone(s) 224, and a network interface 230 including wireless interface(s) 232 and wired interface(s) 234. In some embodiments, a playback device might not include the speaker(s) 222, but rather a speaker interface for connecting the playback device to external speakers. In certain embodiments, the playback device may include neither the speaker(s) 222 nor the audio amplifier(s) 222, but rather a line-out interface for connecting a playback device to an external audio amplifier or audio-visual receiver. The playback device includes a housing 238 carrying its constituent components.

A playback device may further include a user interface 226. The user interface 226 may facilitate user interactions independent of or in conjunction with one or more of the control devices 104 (FIG. 1). In various embodiments, the user interface 226 includes one or more of physical buttons and/or graphical user interfaces provided on touch sensitive screen(s) and/or surface(s), among other possibilities, for a user to directly provide input. The user interface 226 may further include one or more of lights and the speaker(s) to provide visual and/or audio feedback to a user.

In some embodiments, the processor 212 may be a clock-driven computing component configured to process input data according to instructions stored in the memory 216. The memory 216 may be a tangible computer-readable medium configured to store instructions executable by the processor 212. For example, the memory 216 may be data storage that can be loaded with one or more of the software components 214 executable by the processor 212 to achieve certain functions. In one example, the functions may involve a playback device retrieving audio data from an audio source or another playback device. In another example, the functions may involve a playback device sending audio data to another device on a network. In yet another example, the functions may involve pairing of a playback device with one or more other playback devices to create a multi-channel audio environment.

Certain functions may involve a playback device synchronizing playback of audio content with one or more other playback devices. During synchronous playback, a listener may not perceive time-delay differences between playback of the audio content by the synchronized playback devices. U.S. Pat. No. 8,234,395 filed Apr. 4, 2004, and titled "System and method for synchronizing operations among a plurality of independently clocked digital data processing devices," which is hereby incorporated by reference in its entirety, provides in more detail some examples for audio playback synchronization among playback devices in the native domain.

The audio processing components 218 may include one or more digital-to-analog converters (DAC), an audio preprocessing component, an audio enhancement component or a digital signal processor (DSP), and so on. In some embodiments, one or more of the audio processing components 218 may be a subcomponent of the processor 212. In one example, audio content may be processed and/or intentionally altered by the audio processing components 218 to produce audio signals. The produced audio signals may then be provided to the audio amplifier(s) 210 for amplification and playback through speaker(s) 212. Particularly, the audio amplifier(s) 210 may include devices configured to amplify audio signals to a level for driving one or more of the speakers 212. The speaker(s) 212 may include an individual transducer (e.g., a "driver") or a complete speaker system involving an enclosure with one or more drivers. A particular driver of the speaker(s) 212 may include, for example, a subwoofer (e.g., for low frequencies), a mid-range driver (e.g., for middle frequencies), and/or a tweeter (e.g., for high frequencies). In some cases, each transducer in the one or more speakers 212 may be driven by an individual corresponding audio amplifier of the audio amplifier(s) 210. In addition to producing analog signals for playback, the audio processing components 208 may be configured to process audio content to be sent to one or more other playback devices for playback.

Audio content to be processed and/or played back by the playback device 202 may be received from an external source, such as via an audio line-in input connection (e.g., an auto-detecting 3.5 mm audio line-in connection) or the network interface 230. During a VLI session, audio is transmitted from a VLI sender of the VLI system to the VLI receiver using the network interface 230. Such a VLI sender may be, for example, one of the VLI devices 104 (FIG. 1) or one of the control devices 103 (FIG. 1) running the VLI software.

The network interface 230 may be configured to facilitate a data flow between a playback device and one or more other devices on a data network. As such, a playback device may be configured to receive audio content over the data network from one or more other playback devices in communication with a playback device, network devices within a local area network, or audio content sources over a wide area network such as the Internet. In one example, the audio content and other signals transmitted and received by a playback device may be transmitted in the form of digital packet data containing an Internet Protocol (IP)-based source address and IP-based destination addresses. In such a case, the network interface 230 may be configured to parse the digital packet data such that the data destined for a playback device is properly received and processed by the playback device.

As shown, the network interface 230 may include wireless interface(s) 232 and wired interface(s) 234. The wireless interface(s) 232 may provide network interface functions for a playback device to wirelessly communicate with other devices (e.g., other playback device(s), speaker(s), receiver(s), network device(s), control device(s) within a data network the playback device is associated with) in accordance with a communication protocol (e.g., any wireless standard including IEEE 802.11a, 802.11b, 802.11g, 802.11n, 802.11ac, 802.15, 4G mobile communication standard, and so on). The wired interface(s) 234 may provide network interface functions for a playback device to communicate over a wired connection with other devices in accordance with a communication protocol (e.g., IEEE 802.3). While the network interface 230 shown in FIG. 2 includes both wireless interface(s) 232 and wired interface(s) 234, the network interface 230 might include only wireless interface(s) or only wired interface(s) in various examples.

By way of illustration, SONOS, Inc. presently offers (or has offered) for sale certain playback devices including a "PLAY:1," "PLAY:3," "PLAY:5," "PLAYBAR," "PLAYBASE," "BEAM," "CONNECT:AMP," "CONNECT," and "SUB." Any other past, present, and/or future playback devices may additionally or alternatively be used to implement the playback devices of example embodiments disclosed herein. Additionally, it is understood that a playback device is not limited to the example illustrated in FIG. 2 or to the SONOS product offerings. For example, a playback device may include a wired or wireless headphone. In another example, a playback device may include or interact with a docking station for personal mobile media playback devices. In yet another example, a playback device may be integral to another device or component such as a television, a lighting fixture, or some other device for indoor or outdoor use.

b. Example Playback Zone Configurations

Referring back to the system 100 of FIG. 1, the environment may have one or more playback zones, each with one or more playback devices 102. The native media playback system may be established with one or more playback zones, after which one or more zones may be added, or removed to arrive at the example configuration shown in FIG. 1. Each zone may be given a name according to a different room or space such as an office, bathroom, master bedroom, bedroom, kitchen, dining room, living room, and/or balcony. In one case, a single playback zone may include multiple rooms or spaces. In another case, a single room or space may include multiple playback zones.

In some examples, a VLI media playback system may also be established with one or more playback zones. In some cases, such playback zones are established in different physical rooms or areas as the playback zones of the native media playback systems. Such a configuration may avoid duplicating some functionality by having both native playback devices 102 and VLI devices 104 in same physical area. Alternatively, some playback zones of the VLI media playback system may partially or fully overlap with the same physical room or area as the playback zones of the native media playback system. Such a configuration may be useful as the native playback devices 102 and VLI devices 104 may have some different features.

Accordingly, some rooms might not have a playback device 102, but might instead include a VLI device 104 (or no device at all). Other rooms might include both playback device(s) 102 and VLI device(s) 104. For instance, the living room may include playback devices 102a, 102b, 102g, and 102i as the Living Room zone, while also including the VLI device 104e. Some types of playback devices 102 and/or VLI devices 104 may be portable (e.g., battery-powered) while others may draw current from a wall outlet and be intended to be more or less stationary in operation.

In some embodiments, the playback zones in the environment may be presented to a user via a native controller. However, in the native controller, the VLI devices 104 are not presented because they are not native to the native media playback system of playback devices 102. In additional or alternate embodiments, some or all of the zones along with the VLI devices 104 in the environment may be presented to a user via a VLI controller. For example, the native system may identify for the VLI system zones and/or playback devices 102 associated with various zones that are available to be controlled via the VLI controller.

As shown in FIG. 1, the Balcony, Dining Room, Kitchen, Bathroom, and Office zones each have one playback device 102, while the Living Room zone has multiple playback devices 102. In the Living Room zone, playback devices 102a, 102b, 102j, and 102k may be configured to play audio content in synchrony as individual playback devices, as one or more bonded playback devices, as one or more consolidated playback devices, or any combination thereof. Moreover, any playback devices 102 of the native media playback system may form such grouping configurations. VLI devices 104a-e may have similar features, albeit implemented in a different manner from the native playback devices 102. For example, the VLI devices 104b and 104c may together form a stereo pair that is represented as a single device by the VLI controller (via, e.g., a GUI presented on the display by the VLI controller) of the VLI system.

In one example, one or more playback zones in the environment of FIG. 1 may each be playing different audio content. For instance, the user may be grilling in the balcony zone and listening to hip hop music being played by the playback device 102c while another user may be preparing food in the kitchen zone and listening to classical music being played by the playback device 102h. In another example, a playback zone may play the same audio content in synchrony with another playback zone. For instance, the user may be in the office zone where the playback device 102d is playing the same rock music that is being playing by playback device 102c in the balcony zone. In such a case, playback devices 102c and 102d may be playing the rock music in synchrony such that the user may seamlessly (or at least substantially seamlessly) enjoy the audio content that is being played out-loud while moving between different playback zones. Synchronization among playback zones may be achieved in a manner similar to that of synchronization among playback devices, as described in previously referenced U.S. Pat. No. 8,234,395.

As suggested above, the zone configurations of the media playback system 100 may be dynamically modified, and in some embodiments, the media playback system 100 supports numerous configurations. For instance, if a user physically moves one or more playback devices to or from a zone, the media playback system 100 may be reconfigured to accommodate the change(s). For instance, if the user physically moves the playback device 102c from the balcony zone to the office zone, the office zone may now include both the playback device 102d and the playback device 102c. The playback device 102 may be paired or grouped with the office zone and/or renamed if so desired via a control device such as the control devices 103a and 103b. On the other hand, if the one or more playback devices are moved to a particular area in the home environment that is not already a playback zone, a new playback zone may be created for the particular area.

Further, in various examples, one or more of the playback devices 102 may synchronously play back audio with one or more of the VLI devices 104 even though the VLI devices 104 do not form part of the native system of playback devices 102. For instance, in the above example in which the playback device 102c is playing the rock music in the office, the VLI device 104d in the office may also be selected (using, e.g., the VLI controller) to play back the same rock music with the playback device 102c (and/or other playback devices 102). Additionally, the VLI device 104d or another VLI device may initiate playback of the rock music, and other VLI devices 104 and/or playback devices 102 may be grouped and ungrouped for playback of the rock music in the various rooms or spaces in the environment. As such, the VLI devices 104 may seamlessly play back audio in a manner that the user may experience as substantially similar to that of a native media playback system comprising only native domain playback devices 102.

In various implementations, different playback zones of the media playback system 100 may be dynamically combined into zone groups or split up into individual playback zones. For instance, the dining room zone and the kitchen zone may be combined into a zone group for a dinner party such that playback devices 102i and 102l may render audio content in synchrony. On the other hand, the living room zone may be split into a television zone including playback device 102b, and a listening zone including playback devices 102a, 102j, and 102k, if the user wishes to listen to music in the living room space while another user wishes to watch television.

c. Example Control Devices

Figure 3:
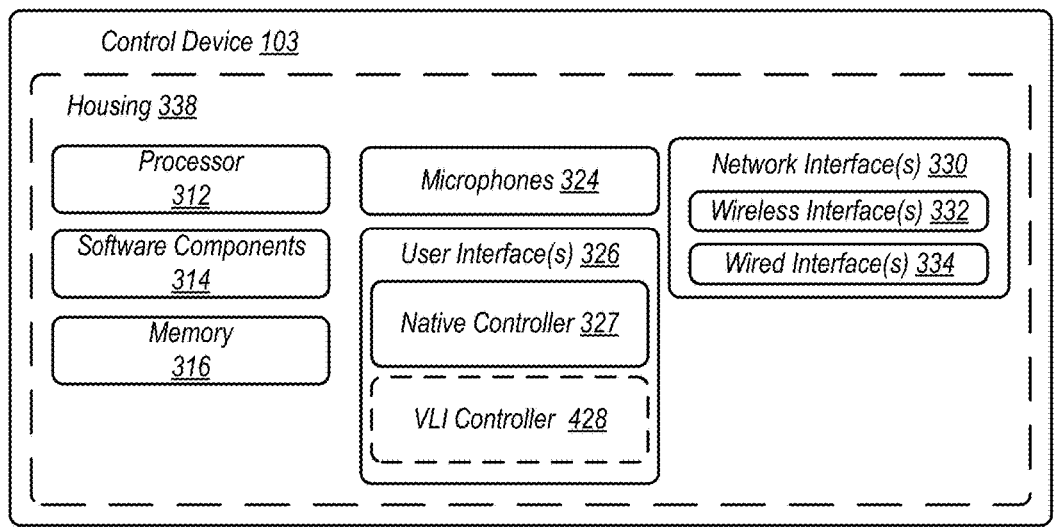
FIG. 3 shows a functional block diagram of an example control device in accordance with aspects of the disclosure.

FIG. 3 is a functional block diagram illustrating certain aspects of a selected one of the control devices 103 of the media playback system 100 of FIG. 1. Such control devices may also be referred to as a controller device. The control device shown in FIG. 3 may include components that are generally similar to certain components of the network devices described above, such as a processor 312, memory 316, and a network interface 330. The control device 103 includes a housing 338 carrying its constituent components.

The memory 316 of the control device 103 may be configured to store controller application software and other data associated with the native media playback system and a user of the native media playback system. The memory 316 may be loaded with one or more software components 314 executable by the processor 312 to achieve certain functions, such as facilitating user access, control, and configuration of the native media playback system. The control device 103 communicates with other network devices over the network interface 330, such as a wireless interface, as described above.

The control device 103 may include a plurality of microphones 324 arranged to detect sound in the environment of the control device 103. The microphones may detect voice inputs to the native media playback system, process those inputs, perhaps using one or more voice assistant services (VAS), and carry out the commands on one or more playback devices 102.

The control device 103 may implement various user interfaces 326, such as control interfaces for controlling the playback devices 102 of the native media playback system. Within examples, the control device 103 may be implemented on a general purpose network device via installation of software for a native controller 327 (i.e., a native control application). Example general purpose network devices include, for example, an iPhone™, iPad™ or any other smart phone, tablet or network device (e.g., a networked computer such as a PC or Mac™). The native controller 327 may be implemented via a control application configured to control the native media playback system or as features of another application, such as a control application of a streaming media service. In another example, a native controller may form part of a control device that is dedicated to the native media playback system, rather than being implemented in, e.g., an application or "app" on a general purpose network device. In addition or alternately, the control device 103 may be implemented in a like manner as a VLI device 104 via installation a VLI controller 428, which is described in greater detail below with reference to FIG. 4. In some embodiments, the control device 103 may be configured to control one or both of the native and the VLI media playback systems via separate access over the respective native and VLI controllers.

Playback device control commands such as volume control and audio playback control may also be communicated from a control device to a playback device via the network interface 330. As suggested above, changes to configurations of the native media playback system may also be performed by a user using the control device. The configuration changes may include adding/removing one or more playback devices to/from a zone, adding/removing one or more zones to/from a zone group, forming a bonded or merged player, separating one or more playback devices from a bonded or merged player, among others. As described above, this control signaling may be referred to as native domain control signaling.

In one example, data and information (e.g., such as a state variable) may be communicated between a control device and other devices via the network interface 330. For instance, playback zone and zone group configurations in the native media playback system may be received by a control device from a playback device, another control device, or another network device, or transmitted by the control device to another playback device or control device via the network interface 330. In some cases, the other network device may be another control device.

d. Example VLI Devices

Figure 4:
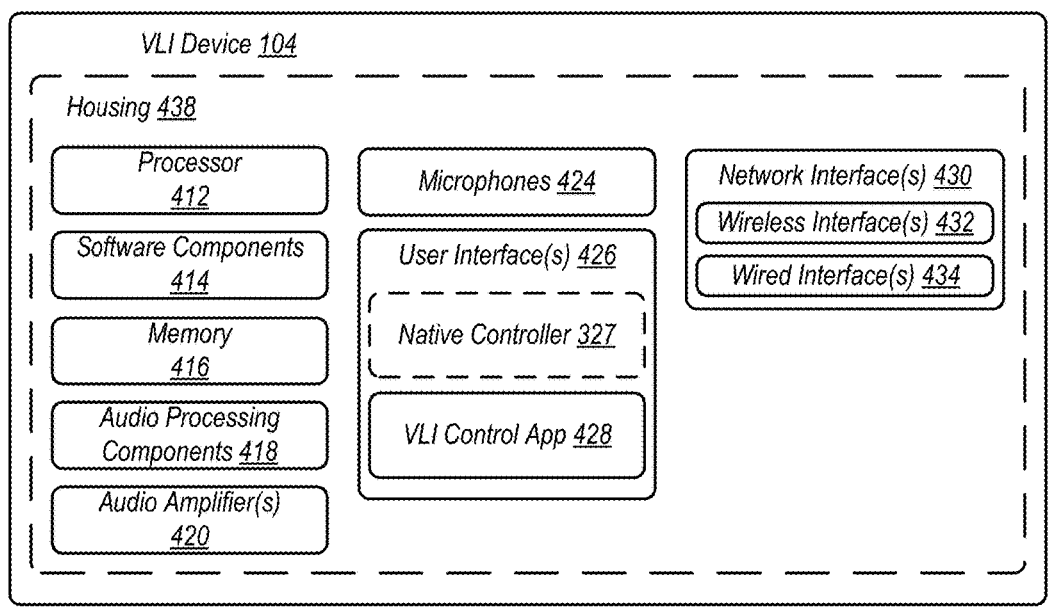
FIG. 4 shows a functional block diagram of an example virtual line-in device in accordance with aspects of the disclosure.

FIG. 4 is a functional block diagram illustrating certain aspects of a selected one of the VLI devices 104 of the media playback system 100 of FIG. 1. As noted above, a VLI device 104 may implement a timing domain different than that of a native domain playback device 102. In various aspects, a VLI device may include certain playback and/or control functionality that is similar to that of the native media playback system, while other functionality may be different than and/or unavailable to the VLI media playback system. In other words, some VLI devices may be configured to perform specific functions such as control or playback, while others are general purpose and capable of performing either. As such the VLI device shown in FIG. 4 may include components that are generally similar to certain components of the playback devices and control devices shown above, such as a processor 412, software components 414, memory 416, audio processing components 418, audio amplifiers 420, microphones 424, and a network interface 430, contained within a housing 438.

Example general purpose VLI devices include, for example, an iPhone™, iPad™ or any other smart phone, tablet or network device (e.g., a networked computer such as a PC or Mac™. Generally, a general purpose VLI device is capable of operating as a VLI sender to a VLI receiver. A general purpose network device may become a general purpose VLI device via installation of the VLI controller 428, which may provide controls for playback and/or control functionality in the VLI domain. A control device 103 that operates as a VLI sender may be referred to herein as a VLI device 104 when referring to its VLI domain functionality. A control device 103 that is not configured to operate as a VLI sender, such as a control device that does not have a VLI controller installed, is not referred to as a VLI device 104.

e. Example User Interfaces

Figures 5A, 5B:
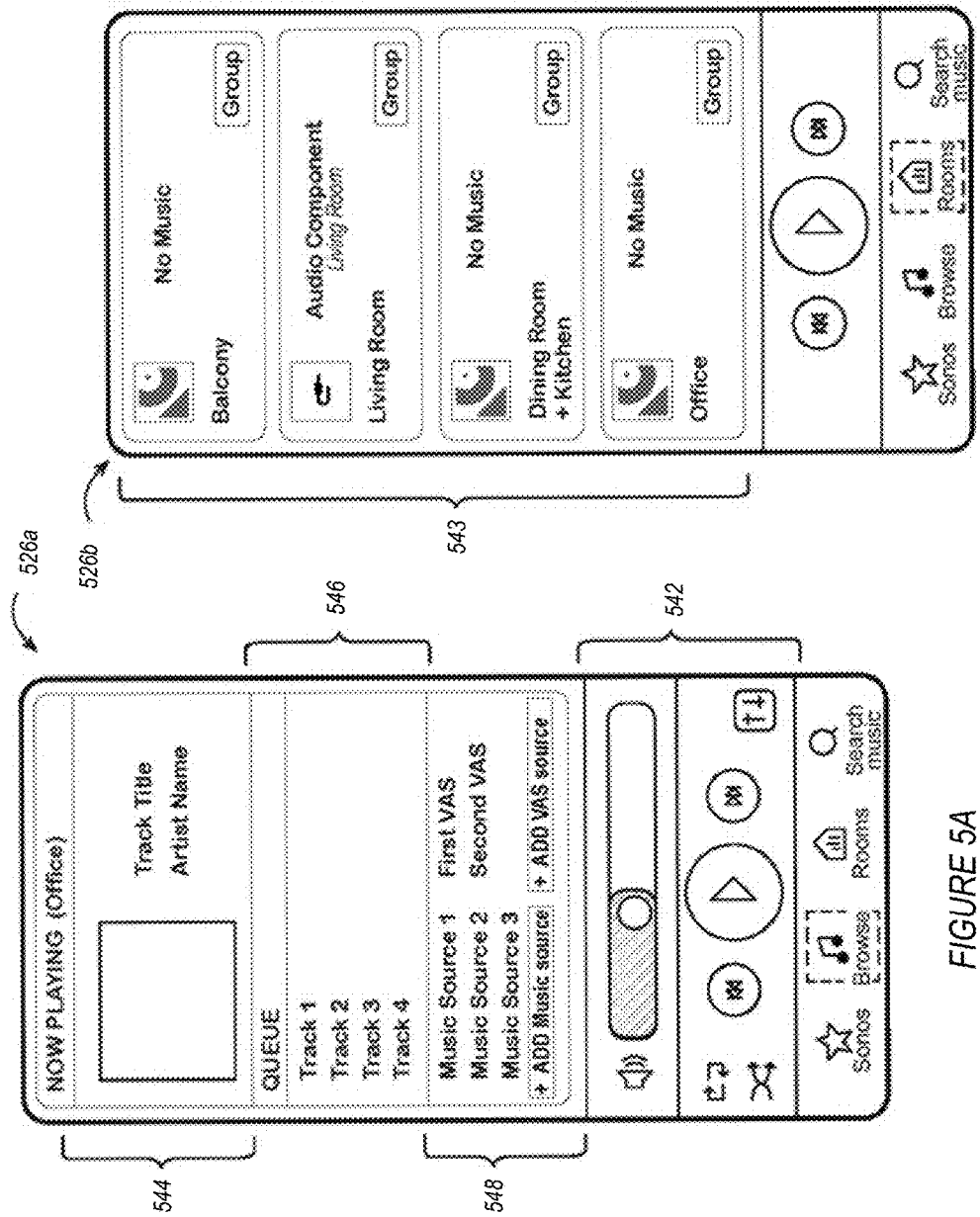
FIGS. 5A and 5B are example native control interfaces in accordance with aspects of the disclosure.

FIGS. 5A and 5B are example user interfaces in the form of native control interfaces 5A and 5B (collectively "control interface 526") in accordance with aspects of the disclosure. As noted above, one or more additional or alternate user interfaces, may be provided via a controller app, such as a VUI. In any case, native control interface(s) of, e.g., a control device 103 may be configured to facilitate user access and control of the native media playback system. As an illustrative example, the control interfaces 526a and 526b shown in FIGS. 5A and 5B may be presented via the native controller 327 (FIG. 3A). Referring to FIGS. 5A and 5B together, the control interface 526 includes a playback control region 542, a playback zone region 543, a playback status region 544, a playback queue region 546, and a sources region 548. The control interface 526 and the respective functions of the native control controller 527 as shown and described below are just one example of user controls that may be provided via a network device such as the control device shown in FIG. 3 and accessed by users to control a media playback system such as the native media playback system of system 100. Other control interfaces of varying formats, styles, and interactive sequences may alternatively be implemented on one or more network devices to provide comparable control access to a media playback system.

The playback control region 542 (FIG. 5A) may include selectable (e.g., by way of touch or by using a cursor) icons to cause playback devices in a selected playback zone or zone group to play or pause, fast forward, rewind, skip to next, skip to previous, enter/exit shuffle mode, enter/exit repeat mode, enter/exit cross fade mode. The playback control region 542 may also include selectable icons to modify equalization settings, and playback volume, among other possibilities.

The playback zone region 543 (FIG. 5B) may include representations of playback zones within the native media playback system. The playback zones regions may also include representation of zone groups, such as the Dining Room+Kitchen zone group, as shown. In some embodiments, the graphical representations of playback zones may be selectable to bring up additional selectable icons to manage or configure the playback zones in the media playback system, such as a creation of bonded zones, creation of zone groups, separation of zone groups, and renaming of zone groups, among other possibilities.

For example, as shown, a "group" icon may be provided within each of the graphical representations of playback zones. The "group" icon provided within a graphical representation of a particular zone may be selectable to bring up options to select one or more other zones in the media playback system to be grouped with the particular zone. Once grouped, playback devices in the zones that have been grouped with the particular zone will be configured to play audio content in synchrony with the playback device(s) in the particular zone. Analogously, a "group" icon may be provided within a graphical representation of a zone group. In this case, the "group" icon may be selectable to bring up options to deselect one or more zones in the zone group to be removed from the zone group. Other interactions and implementations for grouping and ungrouping zones via a user interface such as the native control interface 526 are also possible. The representations of playback zones in the playback zone region 543 (FIG. 5B) may be dynamically updated as playback zone or zone group configurations are modified.

The playback status region 544 (FIG. 5A) may include graphical representations of audio content that is presently being played, previously played, or scheduled to play next in the selected playback zone or zone group. The selected playback zone or zone group may be visually distinguished on the control interface, such as within the playback zone region 543 and/or the playback status region 544. The graphical representations may include track title, artist name, album name, album year, track length, and other relevant information that may be useful for the user to know when controlling the media playback system via the native control interface 526.

The playback queue region 546 may include graphical representations of audio content in a playback queue associated with the selected playback zone or zone group. In some embodiments, each playback zone or zone group may be associated with a playback queue containing information corresponding to zero or more audio items for playback by the playback zone or zone group. For instance, each audio item in the playback queue may comprise a uniform resource identifier (URI), a uniform resource locator (URL) or some other identifier that may be used by a playback device in the playback zone or zone group to find and/or retrieve the audio item from a local audio content source or a networked audio content source, possibly for playback by the playback device.

In one example, a playlist may be added to a playback queue, in which case information corresponding to each audio item in the playlist may be added to the playback queue. In another example, audio items in a playback queue may be saved as a playlist. In a further example, a playback queue may be empty, or populated but "not in use" when the playback zone or zone group is playing continuously streaming audio content, such as Internet radio that may continue to play until otherwise stopped, rather than discrete audio items that have playback durations. In an alternative embodiment, a playback queue can include Internet radio and/or other streaming audio content items and be "in use" when the playback zone or zone group is playing those items. Other examples are also possible.

When playback zones or zone groups are "grouped" or "ungrouped," playback queues associated with the affected playback zones or zone groups may be cleared or re-associated. For example, if a first playback zone including a first playback queue is grouped with a second playback zone including a second playback queue, the established zone group may have an associated playback queue that is initially empty, that contains audio items from the first playback queue (such as if the second playback zone was added to the first playback zone), that contains audio items from the second playback queue (such as if the first playback zone was added to the second playback zone), or a combination of audio items from both the first and second playback queues. Subsequently, if the established zone group is ungrouped, the resulting first playback zone may be re-associated with the previous first playback queue, or be associated with a new playback queue that is empty or contains audio items from the playback queue associated with the established zone group before the established zone group was ungrouped. Similarly, the resulting second playback zone may be re-associated with the previous second playback queue, or be associated with a new playback queue that is empty, or contains audio items from the playback queue associated with the established zone group before the established zone group was ungrouped. Other examples are also possible.

With reference still to FIGS. 5A and 5B, the graphical representations of audio content in the playback queue region 546 (FIG. 5B) may include track titles, artist names, track lengths, and other relevant information associated with the audio content in the playback queue. In one example, graphical representations of audio content may be selectable to bring up additional selectable icons to manage and/or manipulate the playback queue and/or audio content represented in the playback queue. For instance, a represented audio content may be removed from the playback queue, moved to a different position within the playback queue, or selected to be played immediately, or after any currently playing audio content, among other possibilities. A playback queue associated with a playback zone or zone group may be stored in a memory on one or more playback devices in the playback zone or zone group, on a playback device that is not in the playback zone or zone group, and/or some other designated device. Playback of such a playback queue may involve one or more playback devices playing back media items of the queue, perhaps in sequential or random order.

Figure 6:
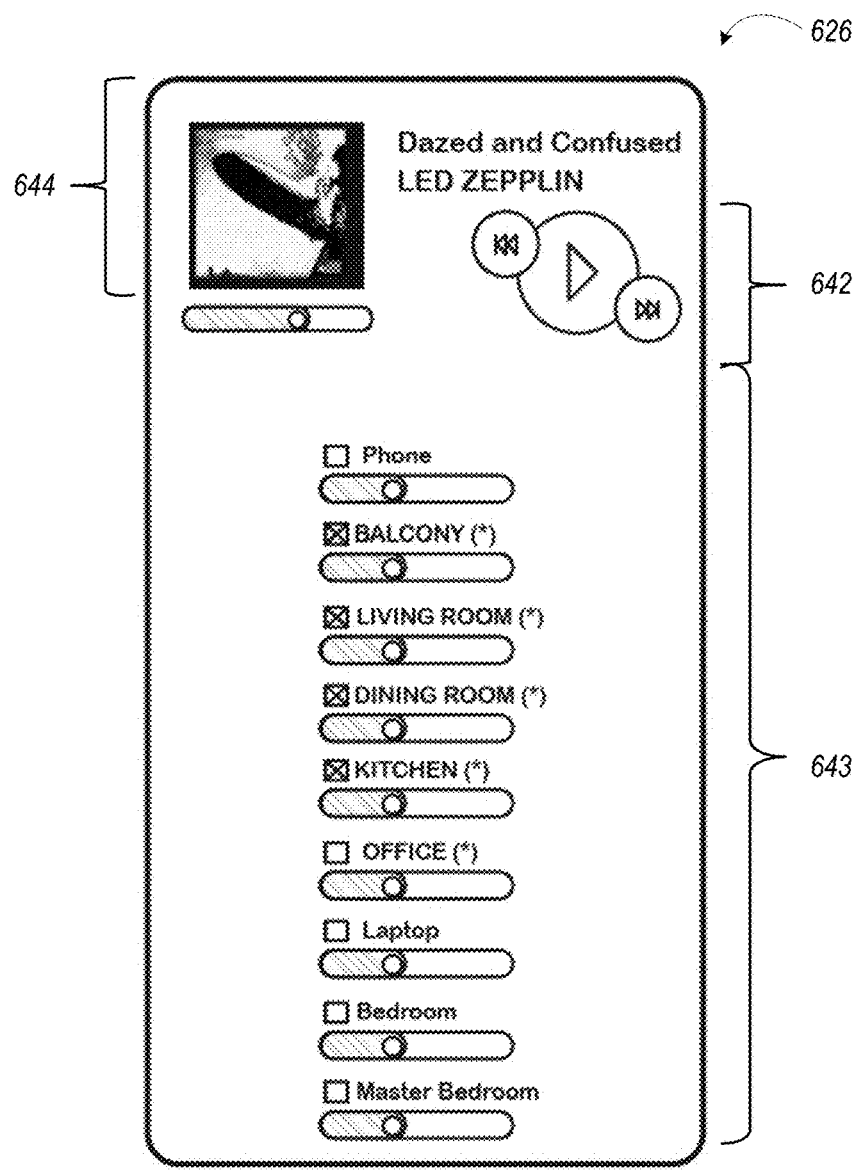
FIG. 6 is an example virtual line-in (VLI) control interface in accordance with aspects of the disclosure.

FIG. 6 is an example VLI control interface 626 of in accordance with aspects of the disclosure. Similar to the control interface presented by a native control application, such as the control interface 526 shown in FIGS. 5A and 5B, the control interface(s) of a VLI device 104 may be configured to facilitate user access, control, and/or playback of the native media playback system. For example, as shown in FIG. 5, the control interface 626 of the VLI controller 428 (FIG. 4) may include several similar regions as the control interface 526 (FIGS. 5A and 5B) presented via the native controller 327 (FIG. 3). For instance, the control interface 526 of the VLI controller 428 includes a playback control region 642 and playback status region 644, which may be generally similar to the playback control region 542 (FIG. 5A) and the playback status region 544 (FIG. 5A), respectively.

The control interface 626 presented by the VLI controller 428 also includes a VLI group region 443. As shown, the VLI group region 443 includes a list of available VLI compatible devices within the native media playback system and the VLI media playback system. In the illustrated example, the VLI devices are identified as "Bedroom," "Master Bedroom," "Phone," and "Laptop," which correspond to the respective VLI devices 104a-e shown in FIG. 1. The VLI compatible devices within the native media playback system (each identified with an asterisk) are associated with certain native playback devices 102 or zones. For example, the Living Room may be associated with playback devices 102a, 102b, 102g, and 102i; the Balcony may be associated with playback device 102c; the Dining Room may be associated with playback device 102e; the Kitchen may be associated with playback device 102h; and the Office may be associated with playback device 102d.

Notably, the playback device 102f shown in the Bathroom in FIG. 1 is not presented on the VLI control interface 426. In some implementations, certain playback devices 102 (such as the playback device 102f) might not support becoming VLI receivers or handling VLI signaling, such as legacy devices, which might have hardware incompatibilities. Within examples, playback device(s) 102 and VLI device(s) 104 may advertise their availability using discovery packets via the LAN provided by router 106.

Upon selection of one or more playback device(s) 102 and/or VLI device(s) 104 in the VLI group region on a particular VLI device 104, the particular VLI device 104 creates a VLI session and forms a VLI group of the selected playback device(s) 102 and/or VLI device(s) 104. The particular VLI device 104 becomes the VLI sender for the new VLI session. Other playback device(s) 102 and/or VLI device(s) 104 are VLI receivers, which receive playback and control information from the VLI sender.

f. Example Audio Content Sources

Turning back to FIG. 5A, the sources region 548 (FIG. 5A) may include graphical representations of selectable audio content sources and voice assistant services. The audio sources in the sources region 548 may be audio content sources from which audio content may be retrieved and played by the selected playback zone or zone group. One or more playback devices in a zone or zone group may be configured to retrieve for playback audio content (e.g., according to a corresponding uniform resource identifier (URI) or uniform resource locator (URL) for the audio content) from a variety of available audio content sources. In one example, audio content may be retrieved by a playback device directly from a corresponding audio content source (e.g., a line-in connection). In another example, audio content may be provided to a playback device over a network via one or more other playback devices or network devices.

Example audio content sources may include a memory of one or more playback devices 102 such as the native or VLI media playback systems of FIG. 1, local music libraries on one or more network devices (such as a control device, a network-enabled personal computer, or a networked-attached storage (NAS), for example), streaming audio services providing audio content via the Internet (e.g., the cloud), or audio sources connected to the native or VLI media playback systems via a line-in input connection on a playback device or network device, among other possibilities.

In some embodiments, audio content sources may be regularly added or removed from a media playback system such as the media playback system 100 of FIG. 1. In one example, an indexing of audio items may be performed whenever one or more audio content sources are added, removed or updated. Indexing of audio items may involve scanning for identifiable audio items in all folders/directory shared over a network accessible by playback devices in the media playback system, and generating or updating an audio content database containing metadata (e.g., title, artist, album, track length, among others) and other associated information, such as a URI or URL for each identifiable audio item found. Other examples for managing and maintaining audio content sources may also be possible.

Example techniques described herein involve implementing the virtual line-in as another possible audio source for the native media playback system. In contrast to other audio sources noted above, the virtual line-in is not selectable within a native domain user interface (e.g., the sources region 548 of the native control interface 526). Instead, the virtual line-in is selected as an audio source for one or more playback device(s) 102 by selecting those playback devices 102 using a VLI domain control interface.

Within examples, the virtual line-in source is implemented as a UPnP service. In such an implementation, each operation has a parameter (e.g., a first parameter) that identifies the type of virtual line-in. This allows the native media playback system to support multiple virtual line-in types, such as multiple media playback systems each using their own domains or other types of input that the native media playback system may handle using the virtual line-in implementation described herein, such as a Bluetooth® audio stream.

Figure 7A:
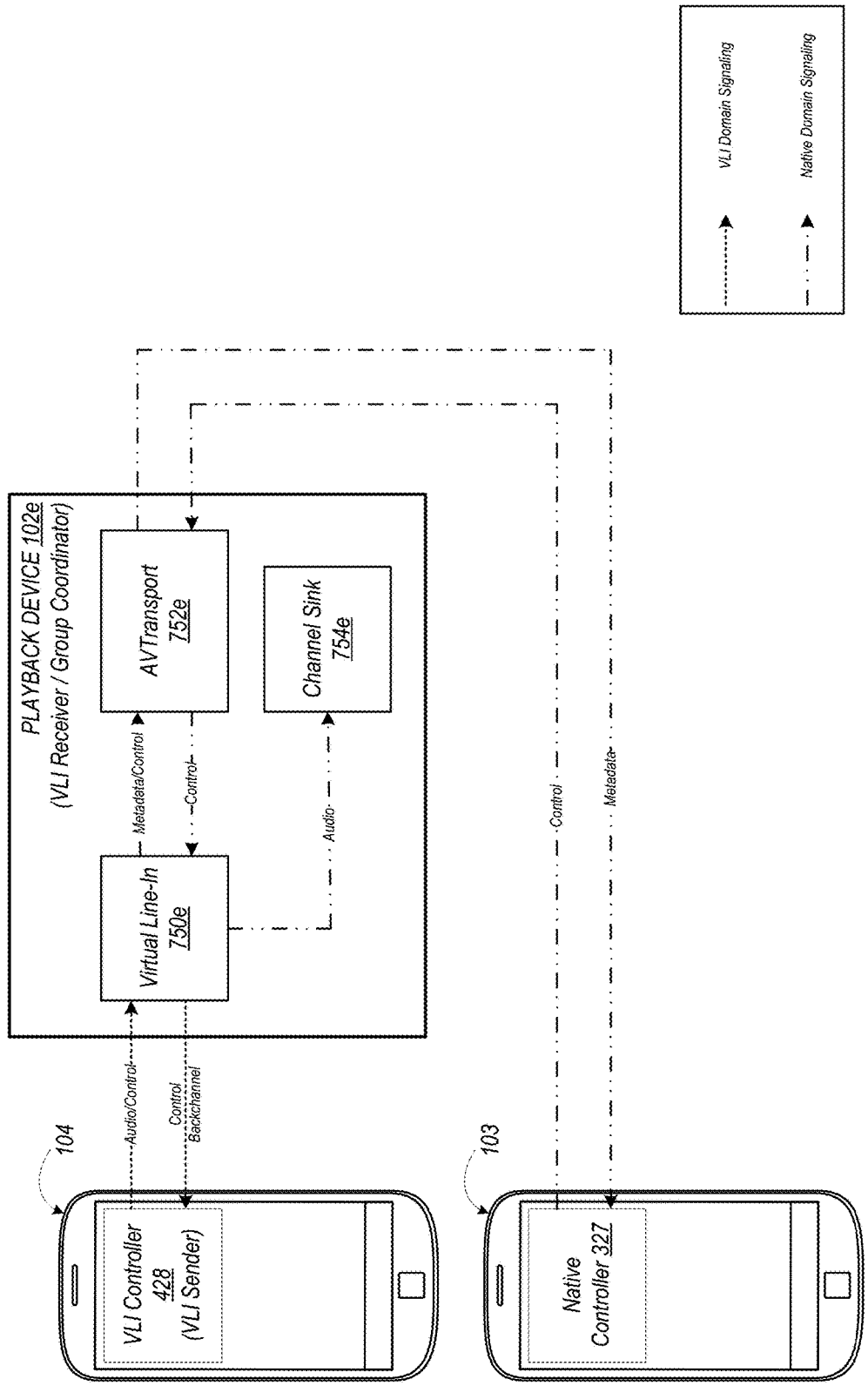

III. Example VLI Group Control and Audio Distribution a. Example Group Configurations FIG. 7A is a functional block diagram illustrating example control and audio distribution within a VLI group that includes the native domain playback device 102e. In this example, the VLI device 104 is the VLI sender, which functions to provide audio to the VLI receiver(s), and which in this example is the playback device 102e. The VLI device 104 that creates the VLI group becomes the VLI sender. The VLI device 104 may create the group using any suitable control interface such as the example control interface of the VLI controller 428 shown above or a VUI (e.g., via a voice command such as "Play David Bowie on Dining Room," where the Dining Room zone corresponds to playback device 102e as shown in FIG. 1).

As shown in FIG. 7A, the VLI sender provides an audio stream to the playback device 102e in the VLI domain. This VLI domain signaling is received at a virtual line-in block 750e, which operates as an interface between the VLI domain of the VLI device 104 and the native domain of the playback device 102. Generally, as noted above, the VLI and native domain signaling is transmitted via a network, such as the LAN provided by router 106 (FIG. 1).

The virtual line-in block 750e converts the VLI domain audio stream from the VLI sender to a native domain audio stream and passes the native domain audio stream to the channel sink 754e. The channel sink 754e decodes the native domain audio stream and passes it to the audio stage (not shown in the FIG. 7A example) for output. In one aspect, since the channel sink 754e receives the audio stream using native domain signaling, the channel sink 754e can process the audio stream in the same way it would process an audio stream that originated in the native domain. In a related aspect, the conversion performed by the virtual line-in 750e facilitates interoperability between the VLI domain audio stream and the native domain channel sink 754e.

Depending on the encoding format of the VLI domain audio stream, the VLI receiver may transcode the VLI domain audio stream into an uncompressed format. For example, if the VLI domain audio stream is encoded in an encoding format that is not supported by the native domain decoder of the channel sink 754e, the virtual line-in 750e decodes the audio stream to an uncompressed format (e.g., PCM). This configuration may use more bandwidth in distributing audio to downstream group members (not shown in the FIG. 7A example), but allows for greater compatibility. Conversely, if the VLI domain audio stream is encoded in an encoding format supported by the native domain, then decoding is not performed until the channel sink 754e. This configuration may have the advantage of being more bandwidth efficient, as the audio stream uses less bandwidth when distributed in compressed format, especially in configurations that include multiple downstream group members.

The virtual line-in 750e also handles metadata from the VLI sender. In some implementations, the virtual line-in 750e extracts metadata from the audio stream and passes the metadata in the native domain to the AVTransport 752e. Alternatively, the VLI sender may send the metadata in a separate data stream using VLI domain control signaling. The playback device 102e in FIG. 7A may be designated a native domain group coordinator as described below. Native domain functions of the native domain group coordinator include distribution of native domain audio and control information (including metadata) to native group members (not shown in FIG. 7A), as well as receiving native domain control information from native domain group members and control devices 103. These functions are carried out in the native domain by the AVTransport 752a.

In the example of FIG. 7A, since it is the only native playback device 102 in the current VLI group, the playback device 102e is necessarily the native domain group coordinator. In effect, the playback device 102e is a native domain group coordinator for a native domain synchrony group that includes only the playback device 102e. The playback device 102e is effectively distributing audio and control information to itself as the native domain group coordinator. In this case, the playback device 102e need not distribute native domain audio and control information (including metadata) to native group members until such group members are later added. As such, in alternative implementations, a native domain group coordinator might not necessarily be designated when a single native domain playback device 102 is in a VLI group.

Since the AVTransport 752e receives the metadata using native domain signaling, the AVTransport 752e can process the metadata in the same way it would process metadata from an audio stream that originated in the native domain. That is, the AVTransport 752e distributes metadata of the currently playing audio stream (which is received from the VLI sender during a VLI session) to native domain group members and control devices 103. The native controller 327 on the control device 103 receives the metadata and updates the playback status region 544 (FIG. 5A) to reflect the audio content currently being played by the VLI group.

The native controller 327 on the control device 103 is also a source of backchannel control. That is, control commands received via the native control controller 327 on the control device 103 (e.g., via the playback control region 542) are passed back to the AVTransport 752e of the group coordinator using native domain control signaling as shown in FIG. 7A. The AVTransport 752e passes these control commands to the virtual line-in 750e, which converts the native domain control commands to VLI domain control commands that the VLI sender can understand. For instance, the virtual line-in 750e may convert the native domain control commands to equivalent VLI domain API function calls.

The virtual line-in 750e transmits these VLI domain commands back to the VLI sender. The VLI sender then responds to the commands. For instance, in response to a skip forward command, the VLI sender starts streaming the next song. As another example, in response to a volume increase or decrease command, the VLI sender sends a VLI domain command to increase or decrease volume back to the VLI receivers(s). This VLI domain command is carried out by the virtual line-in 750e and also converted to a native domain command for distribution to native domain group members via the AVTransport 752e. Notably, even though the command may have originated via the native domain control controller 327, the command is not carried out until it is received back from the VLI sender, which is the audio and control master of the VLI group.

Figure 7B:
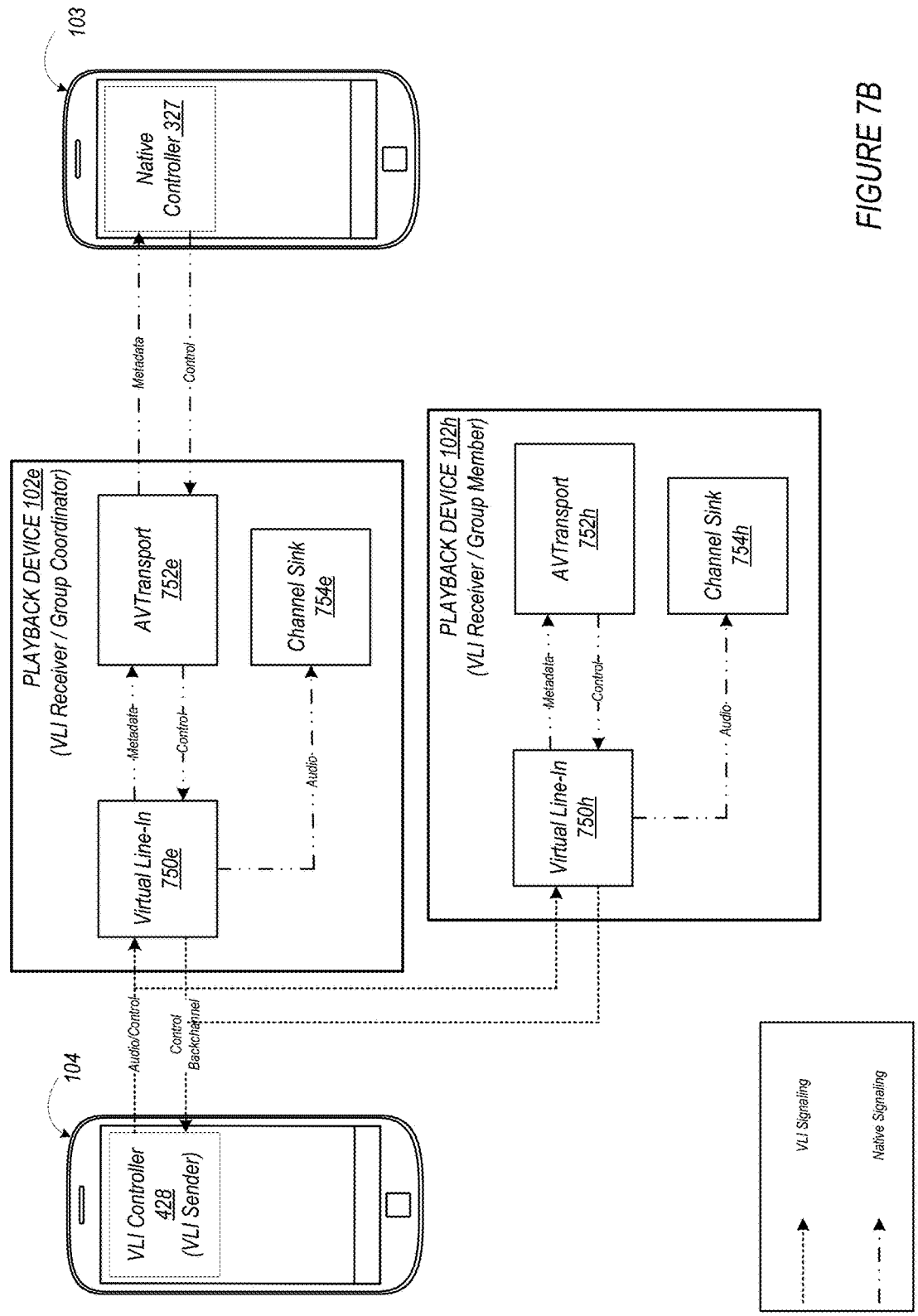

FIG. 7B is a functional block diagram illustrating example control and audio distribution within a VLI group that includes the playback device 102e and the playback device 102h. Again, in this example, the VLI device 104 is the VLI sender, which, as noted above, functions to provide audio to the VLI receiver(s), which in this example is the playback device 102e. The VLI device 104 may create this VLI group using any suitable control interface such as the example control interface of the VLI controller 428 shown above (e.g., by selecting Living Room and Dining Room in the VLI group region 443 or a VUI (e.g., via a voice command such as "Play David Bowie on Dining Room and Living Room").

As shown in FIG. 7B, as audio and control master of the VLI group, the VLI sender provides an audio and control signaling to another VLI receiver that has been added as a VLI domain group member of the VLI group (which is playback device 102h in this example). The virtual line-in 750e operates in the same manner as described in the example shown in FIG. 7A. The virtual line-in 750h of the playback device 102h operates in a similar manner.

Notably, in addition to being VLI domain group members (VLI receivers), the playback device 102e and the playback device 102h are also native domain group members. Within example implementations, playback devices 102 that are joined into a VLI domain group may automatically form a native domain group. Such auto-grouping may facilitate interoperability with native domain control devices 103 and playback devices 102, as the native domain grouping will be recognizable to native domain devices. As noted above, under native domain grouping, one playback device 102 will function as a group coordinator (which is playback device 102e in this example) while the other playback devices will function as group members.

Due to the native domain grouping, native domain group members (e.g., playback device 102h) may implement a control backchannel to the VLI sender through the native domain group coordinator (e.g., playback device 102e) as shown in FIG. 7B. This control backchannel may be implemented in addition to, or as an alternative to, the backchannel implemented through the virtual line-in of each VLI group member. Under this configuration, native domain control signaling from a group member is processed by the group coordinator in the same way as native domain control signaling from a control device 103, as described above in connection with FIG. 7A.

FIG. 7C is a functional block diagram illustrating example control and audio distribution within a VLI group that includes the playback device 102h. This example is intended to demonstrate the flexibility of the virtual line-in implementation. In this example, the VLI sender created a VLI group that included playback device 102e and then playback was transferred to playback devices 102h and 102d using native domain control. For instance, such a transfer may involve the playback devices 102d and 102h forming a native domain group with playback device 103e using the native controller 327. Then, using native domain control, the playback devices 102e is deselected from the native domain group, thereby creating the configuration shown in FIG. 7C.

To continue playback from the VLI sender, the playback device 102e continues to operate as VLI receiver, as it was the only VLI receiver in the VLI group. However, instead of operating as a VLI receiver for itself, the playback device 102e operates as a VLI receiver on behalf of the playback device 102h, which becomes the group coordinator of the native domain group when the playback device 102e leaves the native domain group. Since the playback devices 102e is no longer in the native domain group (and no longer functioning as the group coordinator or playing back audio), the AVTransport 752e and Channel Sink 754e are de-activated, as shown. Then, the playback devices 102h and 102d carry out synchronous playback using native domain signaling, also as shown.

Figure 7D:
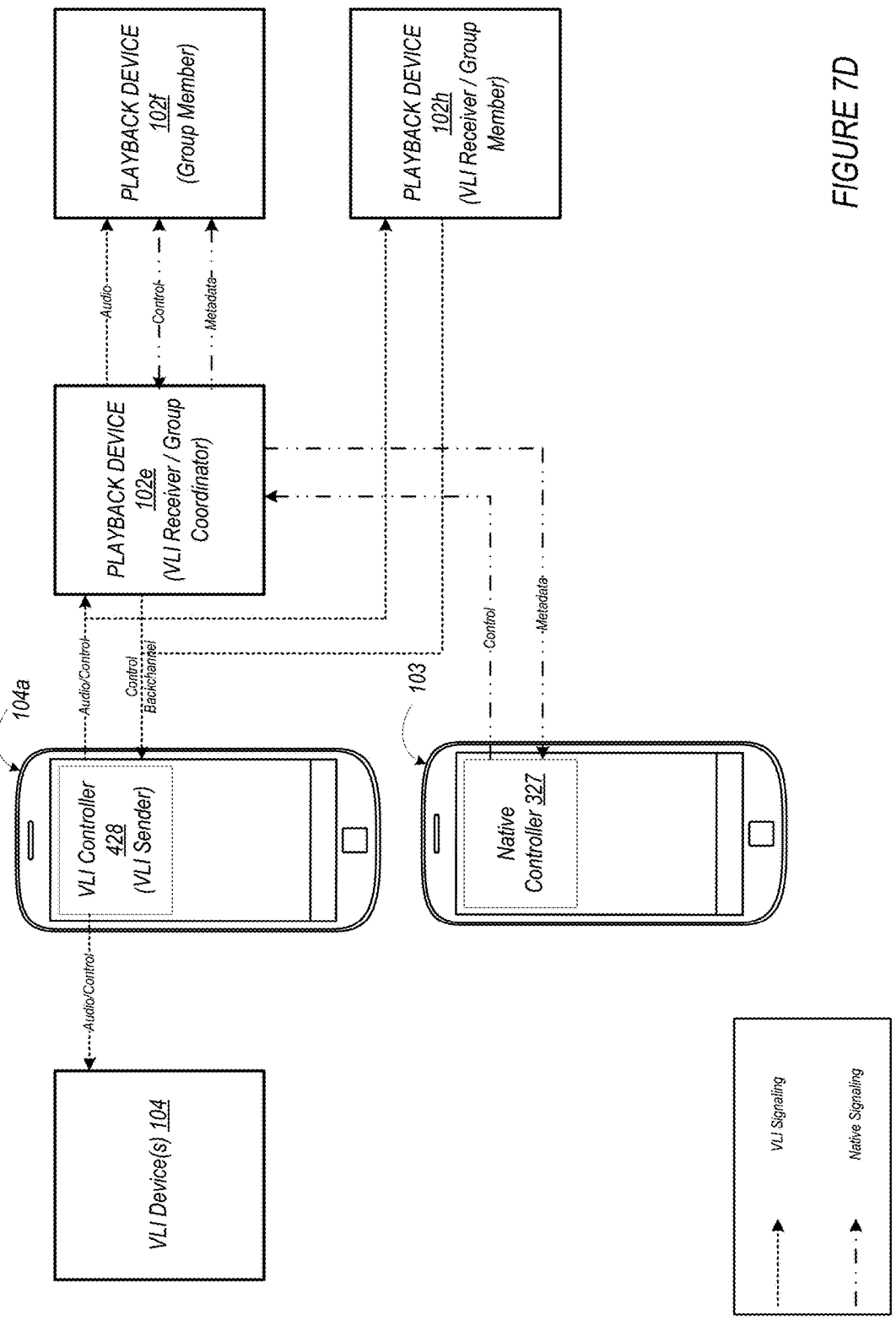

FIG. 7D is a simplified functional block diagram illustrating example control and audio distribution within a VLI group that includes both VLI devices 104 and playback devices 102 of the native media playback system. In particular, the VLI group includes the playback devices 102e and 102h, as well as any number of VLI devices 104. In this example, the VLI device 104a is the VLI sender. The VLI device 104a may create this VLI group using any suitable control interface such as the example control interface of the VLI controller 428 shown above (e.g., by selecting Kitchen, Dining Room, and one or more of the VLI devices such as Bedroom or Laptop in the VLI group region 643 or a VUI (e.g., via a voice command such as "Play The Modern Lovers on Kitchen, Dining Room, Laptop, and Bedroom").

In addition to the playback devices 102e and 102h, which are VLI receivers in the VLI group, the example configuration shown in FIG. 7D also shows the playback device 102f in a native domain grouping with the playback devices 102e and 102h. Notably, the playback device 102f is not in the VLI group. As such, the playback device 102f is not a VLI receiver and instead exchanges native domain audio and control signaling with the group coordinator of the native domain group. As noted above, the playback device 102f may be an example of a native playback device that is a legacy or other device with incompatibilities that do not allow it to become a VLI receiver. Alternately, the playback device may be a native playback device (e.g., playback device 102d) that is capable of but not designated as a VLI receiver in the example implemented in FIG. 7D.

b. Example Native Group Interactions

As noted above, selection of one or more playback devices 102 and/or VLI devices 104 using a VLI domain user interface creates a VLI session and forms a VLI domain synchrony group among the selected devices. For instance, if Living Room is selected using the VLI controller, the VLI sender creates a VLI session with a VLI group that includes the playback device 102e as a VLI receiver, as shown in FIG. 7A. If the playback device 102e is in any native domain group, the playback device 102e is removed from this group when joined into the VLI domain group.

Continuing the example above, if another playback device 102 is selected using a VLI domain user interface, this playback device 102 is added to the VLI group as a VLI receiver. For instance, as shown in FIG. 7B, the playback device 102h is a second VLI receiver. If the playback device 102h is in any native domain group, the playback device 102e is removed from this group when joined into the VLI domain group. Both VLI receivers receive audio and control signaling in the VLI domain from the VLI sender.

Moreover, when two or more playback devices 102 are joined into the same VLI group, these playback devices automatically form a native domain group. Automatic grouping may be implemented using a state variable indicating the group ID of the VLI group. This group ID may represent the VLI sender, perhaps by way of the audio stream originating from the VLI sender. As described above, the devices of the native media playback system may share status information by sharing state variables in a distributed fashion with each player maintaining the current values of state variables of each playback device 102 within the native media playback system. When the group IDs of two or more playback devices 102 match (which occurs when they are part of the same VLI group and are receiving the same audio stream), the native media playback system automatically groups these playback devices into a native domain group using native domain signaling.

In some implementations, automatic native domain grouping is performed by native group coordinators. That is, native group coordinators monitor the group IDs for the native players in the native media playback system. When the group ID of a native group coordinator matches the group ID of another native group coordinator, the native group coordinator may initiate grouping with the other native group coordinator. If these native group coordinators are in synchrony groups with group members, these group members are moved into the automatically formed group by their respective group coordinators. In alternative implementations, the automatic grouping can be performed by group members or native controllers, among other examples.

When automatically forming the native domain group, the native media playback system assigns one playback device 102 to be the group coordinator and the other playback devices to be group members. As noted above, the native domain group coordinator distributes audio and control signaling to the group members. If the native domain group is a stereo pair or surround sound configuration, the preferred group coordinator may be, e.g., the left channel of the stereo pair or the center channel of the surround sound configuration. Other examples are possible as well.

When a playback device 102 is de-selected, the playback device 102 is removed from the VLI group. Since that playback device 102 is no longer receiving the same audio stream from the VLI sender as the other VLI group members, its group ID will no longer match the group IDs of the other VLI group members, which causes the native media playback system to remove it from the native domain group as well. If the VLI receiver that is also the group coordinator of the native domain group is removed from the VLI group, the native media playback system assigns another VLI receiver to be the group coordinator. When the last remaining playback device 102 in a VLI group is de-selected, the VLI session ends.

In the event that all playback device(s) 102 in a VLI group are de-selected at the same time or the VLI session otherwise ends, the native media playback system may automatically maintain the native domain group. The VLI device 104 may de-select all playback device(s) 102 in a VLI group at the same time by selecting another playback target using the VLI group region 443, perhaps by selecting "Play on this device" or the like. Alternatively, the VLI device 104 may de-select all playback device(s) 102 using a VUI (e.g., via a voice command such as "Play David Bowie on Bedroom," where the Bedroom zone corresponds to the VLI device 104a.

In some examples, the VLI sender may transmit a signal to a group coordinator of the native media playback system to indicate that all of the native playback devices have been deselected at the same time. In additional or alternate embodiments, a native domain group is maintained for any playback devices 102 that were de-selected from a VLI group via the VLI controller 428 within a given window of time from when the first playback device was removed from the VLI group. For example, if two or more playback devices 102 are de-selected from a VLI group within a given window of time (e.g., a 3-second window of time), the group of de-selected devices may be maintained in a native group.

In contrast, devices that are de-selected outside of this window of time are not automatically joined to the native domain group. For instance, if a VLI group comprising a VLI device 104 and the playback devices 102 corresponding to the Living Room, Kitchen, and Dining Room zones has the Living Room and Kitchen zones de-selected within a three second window of time from when the first zones was de-selected, the Living Room and the Kitchen zones would together form a native domain group. If the Dining Room zone is later removed from the VLI group (i.e., outside of the window of time), the Dining Room zone would not become part of the native domain Living Room and Kitchen group.

In some cases, a phone call or other event involving audio on the VLI sender may interrupt the VLI session. Such events may take control of the audio pipeline on the VLI sender. These events cause the VLI session to be terminated and then automatically restarted when the event ends.

As noted above, a native domain user interface (such as a GUI or VUI) may interact with the playback device(s) 102 in the VLI group, as demonstrated with the native controller 327 on the control device 103 in FIGS. 7A-7D. Example operations involve adding and removing one or more playback device(s) 102 from the native domain group (which was automatically formed when the VLI group was formed). Removing the group coordinator from the native domain group causes the native media playback system to assign a new VLI receiver (if available) as the group coordinator.

Other example operations include changing the audio source of the native domain group to a non-VLI source. When the audio source of the native domain group is changed to a non-VLI source, the playback device(s) 102 in the VLI group are removed from the VLI group. However, the native media playback system maintains the native domain group and starts playing back audio from the new audio source.

IV. Example VLI Timing Distribution

Figure 8A:
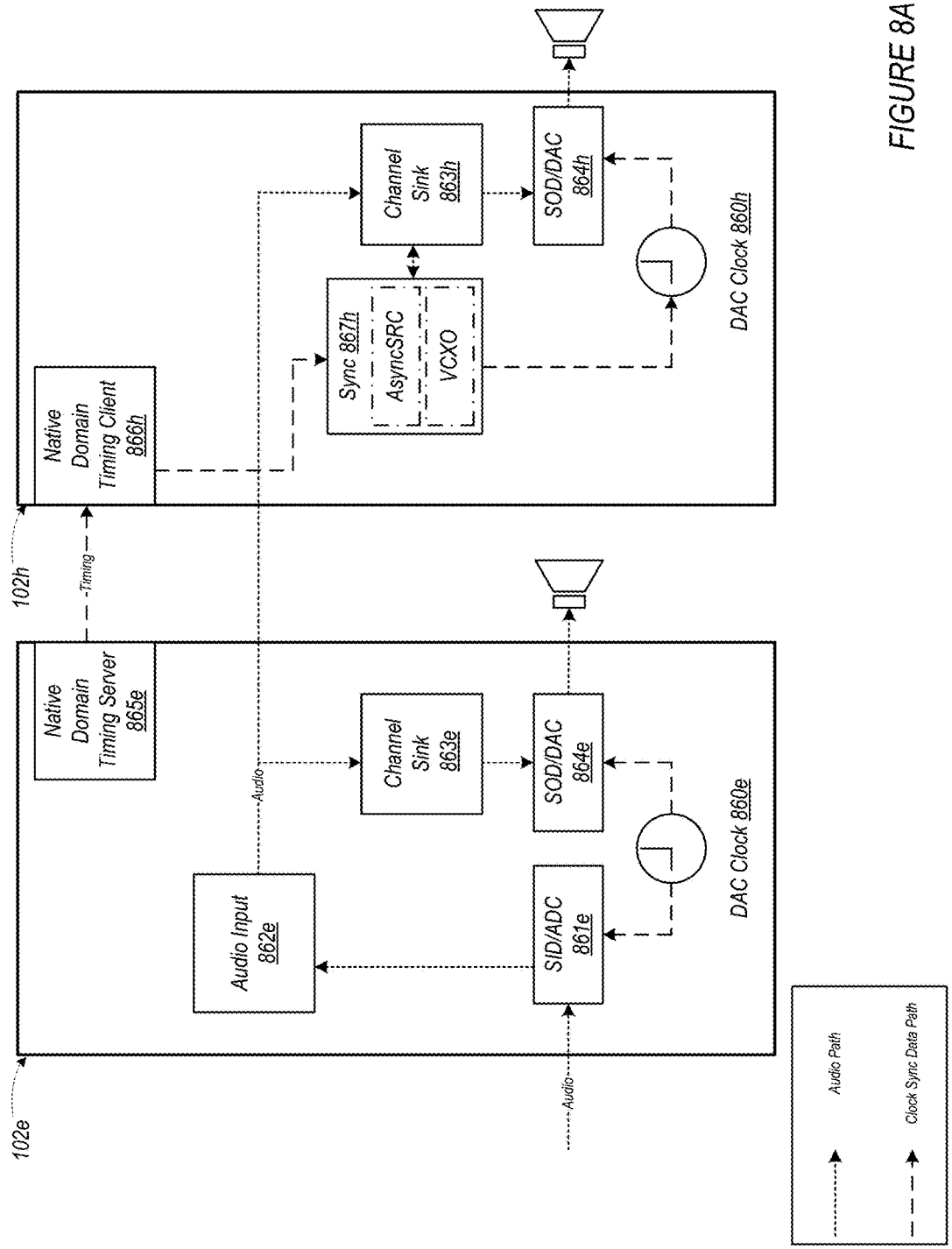

FIG. 8A is a functional block diagram illustrating example timing distribution within a native domain synchrony group that includes playback devices 102e and 102h. In this example, the playback devices 102e and 102h are not members of a VLI group. The playback device 102e is assigned as the group coordinator, and the playback device 102h is a group member. As the group coordinator, the playback device 102e provides audio and timing information to the group member(s) (i.e., playback device 102h), which enables the group members (playback device 102h) to synchronize its playback to that of the group coordinator. Notably, the playback devices 102e and 102h are independently clocked via a DAC clock 860e and a DAC clock 860h, respectively.

In operation, the sound input device (SID) of the group coordinator (here, the SID/ADC 861e of the playback device 102e) receives a digital audio stream or analog signal. If the received audio is analog, the SID/ADC 861e digitizes the analog signal into a digital audio stream. In some examples, the SID and ADC may be separate components. In practice, they are often implemented on the same physical CODEC chip and so are shown by way of example as a single component.

The SID/ADC 861e processes the audio content at a rate set by the DAC clock 860e. Ultimately, the DAC clock 860e sets the clock for the native domain group. That is, group members (e.g., the playback device 102h) match their clocks (either physically or logically) to the DAC clock of the group coordinator (i.e., the DAC clock 860e).

The audio input of the group coordinator (i.e., the audio input 862e) distributes the audio to each channel sink 863 of the native domain synchrony group (i.e., the channel sinks 863e and 863h). Each channel sink 863 of the native domain synchrony group decodes the audio content, which is then converted to analog and outputted by the signal output device and analog-to-digital converter (SOD/DAC 864), as shown in FIG. 8A.

To facilitate synchronous playback, a native domain clock such as the DAC clock of the group coordinator provides a reference or basis of the timing information of the timing source for the native domain timing server 865 (i.e., the native domain timing server 865e). The native domain timing server 865 implements a network protocol for clock synchronization such as network time protocol (NTP), simplified network time protocol SNTP, real-time transport protocol (RTP) or precision time protocol (PTP), among others. The native domain timing server 865e distributes timing information according to one of these protocols to the native domain client 866h thereby providing the playback device 102h with a signal representing the current clock time of the group coordinator.

Each native group member can assess a timing differential between the master clock and a given group member's DAC clock to periodically adjust its respective DAC clock or adjust a sampling rate (depending on the selected corrective mechanism), with the adjustment ultimately achieving synchrony when audio is played back among devices with independently clocked DACs. In particular, this timing signal representing the time domain of the group coordinator is used by the sync 867 of each group member of the native domain synchrony group to keep audio playback of the group member in synchronization with audio playback by the group coordinator. In one implementation, the VCXO of the sync 867h uses the timing signal to "discipline" the DAC clock 860h of the playback device 102h by speeding it up or slowing it down to match the DAC clock 860e. In an alternative implementation, the AsyncSRC of the sync 867 uses the timing signal to cause the channel sink 863h logically insert or remove samples from the audio stream in order for its playback rate to match that of the group coordinator. As noted above, this playback rate is set by the DAC clock 860e.

Certain components that exist in both devices but are not in use in this example are omitted from the block diagram. Generally, each playback device 102 can be assumed to have the same or similar components. Different playback devices 102 may implement similar functions using different hardware (e.g., newer and/or different chips).

Turning now to FIG. 8B, shown is a functional block diagram illustrating example timing distribution within a VLI group that includes the playback device 102e. In this example, the playback device 102h is in a native domain group with the playback device 102e. In this example, the VLI device 104 is the timing master. As such, the playback device 102e uses VLI domain synchronization to synchronize with the VLI device 104. However, the playback device 102h uses native domain synchronization to synchronize with the playback device 102e. At the same time, the native domain synchronization by the group coordinator (the playback device 102e) is derived from the VLI domain synchronization. As such, the playback devices 102e and 102h are ultimately synchronized to the VLI time domain of the VLI device 104.

The playback devices 102 of the native media playback system are configured to synchronize to any of a number of clock sources. As such, the timing master can be either a VLI device 104 or a playback device 102 (e.g., a VLI receiver). The timing master selected based on various factors. In an example hierarchy, the VLI sender is selected to be the timing master unless the VLI sender is battery-powered. In that case, to avoid battery drain associated with operating as the timing master, an AC (wall-powered) VLI device 104 is selected as the timing master. If no AC powered VLI device 104 is in the VLI group, then a playback device 102 is selected as the timing master.

As shown in FIG. 8B, the VLI domain timing server 869 of the VLI device 104 distributes timing information according to a network protocol for clock synchronization thereby providing the playback device 102e with a signal representing the VLI time domain of the timing master. In some examples, the network protocol for clock synchronization used by the VLI domain timing server is the same protocol (e.g., NTP, SNTP, RTP or PTP, among others) as used by the native domain timing server and client(s). However, even if they use the same protocol, the respective clocks of the VLI domain and the native domain are not synchronized, as the ultimate source of the clock in each domain is different.

Ultimately, the signal representing the VLI time domain is one input to the audio input 862 of each playback device 102 in the VLI group. Another input to the audio input 862 of each playback device 102 in the VLI group (i.e., the VLI receivers) includes the audio stream from the VLI sender, which in this example is the VLI device 104. However, the VLI sender and the VLI timing domain master need not be the same device, as noted above.

The audio input 862e of the playback device 102e processes audio content from the VLI sender at a rate set by the CPU clock 859e and passes the audio content to the channel sink 863e, as shown in FIG. 8B. Since the playback device 102e is also the native domain group coordinator of a native domain group that include the playback device 102h as a group member, the audio input 862e distributes the audio to the channel sink 863 of the each native domain group member (i.e., the channel sink 863h). Each channel sink 863 decodes the audio content, which is then converted to analog and outputted by the signal output device and digital-to-analog converter (SOD/DAC 864), as shown in FIG. 8B.

To facilitate synchronous playback, the audio input 862e of the playback device 102e also generates a skew signal representing the error between the CPU clock 859e and the clock of the VLI domain (which the audio input 862e receives from the VLI domain timing server 869). For instance, the skew signal may represent a number of audio samples that CPU clock 859e is ahead of or behind the VLI domain clock. For instance, consecutive elements of the skew signal might be +3 samples, −2 samples, −1 samples, +2 samples.

The virtual clock 870e uses the CPU clock 859e and the skew signal to derive a virtual clock signal synchronized to the VLI domain master clock, which becomes the master clock in the native domain. That is, in contrast to FIG. 8A where the DAC clock 860 of the group coordinator is the native domain timing master, in this example, the native domain timing master is the virtual clock. Since the virtual clock is synchronized to the VLI domain master clock, the native timing domain becomes synchronized to the VLI timing domain when using the virtual clock.

To convert the virtual clock 870e into a native domain format, the virtual clock 870e is used to seed a native domain timing server 865e, which distributes native domain timing information to a native domain timing client 866e on the group coordinator itself, as well as a native domain timing client(s) on each native domain group member (i.e., native domain timing client 866h). From that point, the sync 867 of each playback device 102 synchronizes the audio output of each playback device using the same native domain technique as described with respect to the group member (the playback device 102h) in the FIG. 7B example. In other words, the path following the native domain timing client 866 on each playback device 102 is the same as the path following the native domain timing client 866 in the FIG. 7A example. Yet, in the FIG. 7B example, the master clock is ultimately the VLI domain timing master instead of the DAC clock of the native domain group coordinator.

Figure 8C:
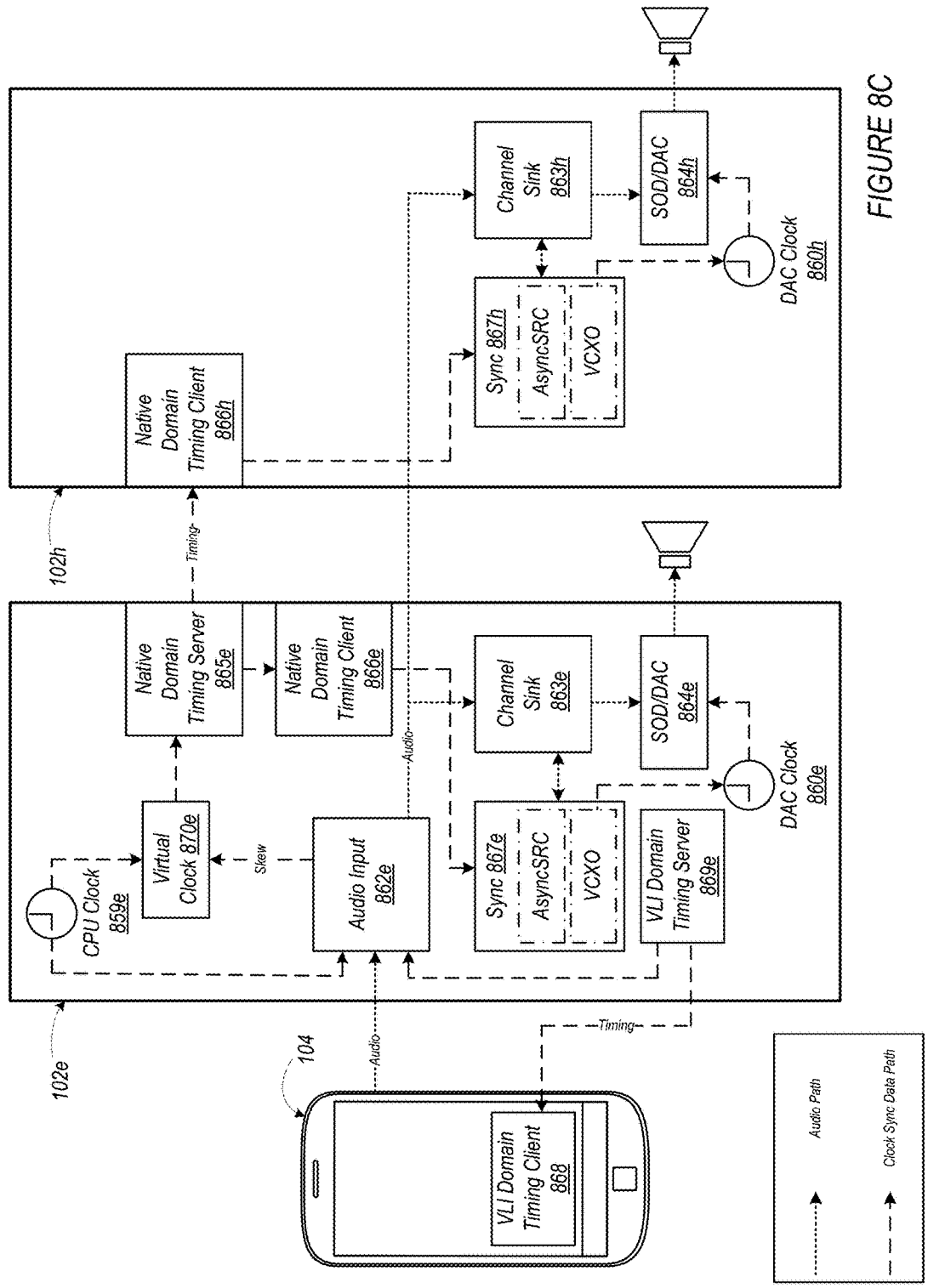

FIG. 8C shows a functional block diagram illustrating a variation on the FIG. 8B example in which the playback device 102e is the VLI domain timing master. As such, the playback device 102e implements a VLI domain time server 869e that distributes VLI domain timing information to the VLI sender, as well as any number of VLI receivers, including VLI devices 104 and playback devices 102.

Further, like the FIG. 8B example, in the FIG. 8C example, the playback device 102h is in a native domain group with the playback device 102e. However, with the exception of the VLI domain timing originating with the VLI domain timing server 869e (instead of the VLI domain timing server 869 on the VLI device 104), all functionality is the same, as shown in FIG. 8C.

Figure 9A:
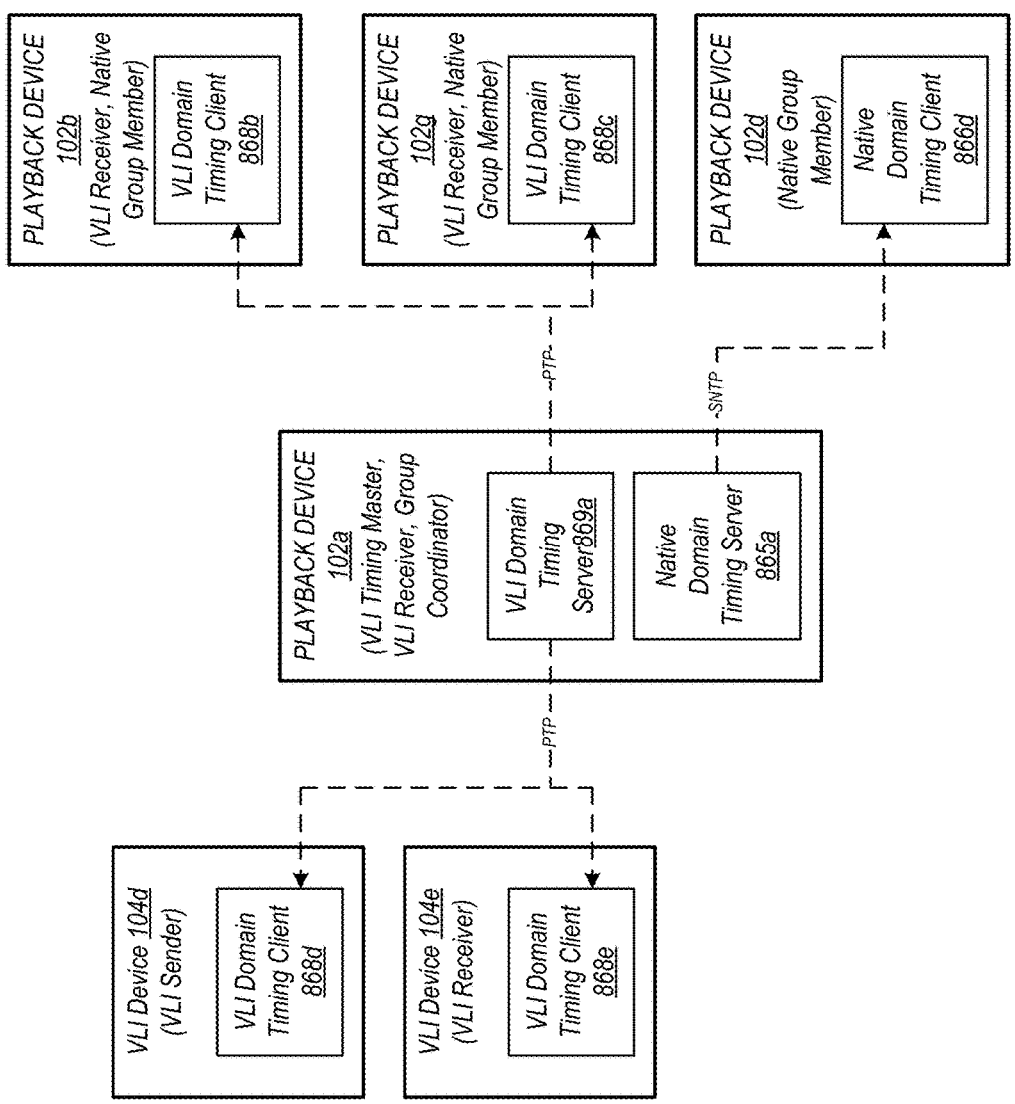
FIGS. 9A and 9B are example functional block diagrams corresponding to example virtual line-in timing configurations in accordance with aspects of the disclosure.

Turning now to FIG. 9A, shown is a simplified functional block diagram illustrating example timing distribution within VLI and native domain groups. The VLI group includes VLI devices 104d and 104e as a VLI sender and receiver, respectively, as well as playback devices 102a, 102b, and 102g as VLI receivers. In addition to playback devices 102a, 102b, and 102g, the native domain group includes the playback device 102d, which was added to the native domain group using native domain signaling. As such, the playback device 102d is not a VLI receiver of the VLI group. The playback device 102a is the group coordinator of the native domain group.

In the FIG. 9A example, the playback device 102a is the VLI timing master. As such, the playback device 102a distributes VLI timing information to each VLI receiver in the VLI group, which includes the VLI devices 104d and 104e, as well as the playback devices 102b and 102g. The playback devices 102b and 102g operating as VLI receivers process the audio from the VLI sender and the VLI domain timing information from the VLI timing master in a similar manner as playback device 102e in the FIG. 8B example. In this example, the VLI domain media playback system utilizes the PTP protocol, so VLI domain timing information is labeled PTP.

The playback device 102a processes the processes the audio from the VLI sender and the VLI domain timing information in a similar manner as playback device 102e in the FIG. 8C example, as the VLI domain timing server is implemented in the playback device 102a. Moreover, the playback device 102a distributes native domain audio and timing information to the playback device 102d in a similar manner as the playback device 102e and playback device 102h in the FIG. 8C example. In this example, the native domain media playback system utilizes the SNTP protocol, so VLI domain timing information is labeled SNTP.

Figure 9B:
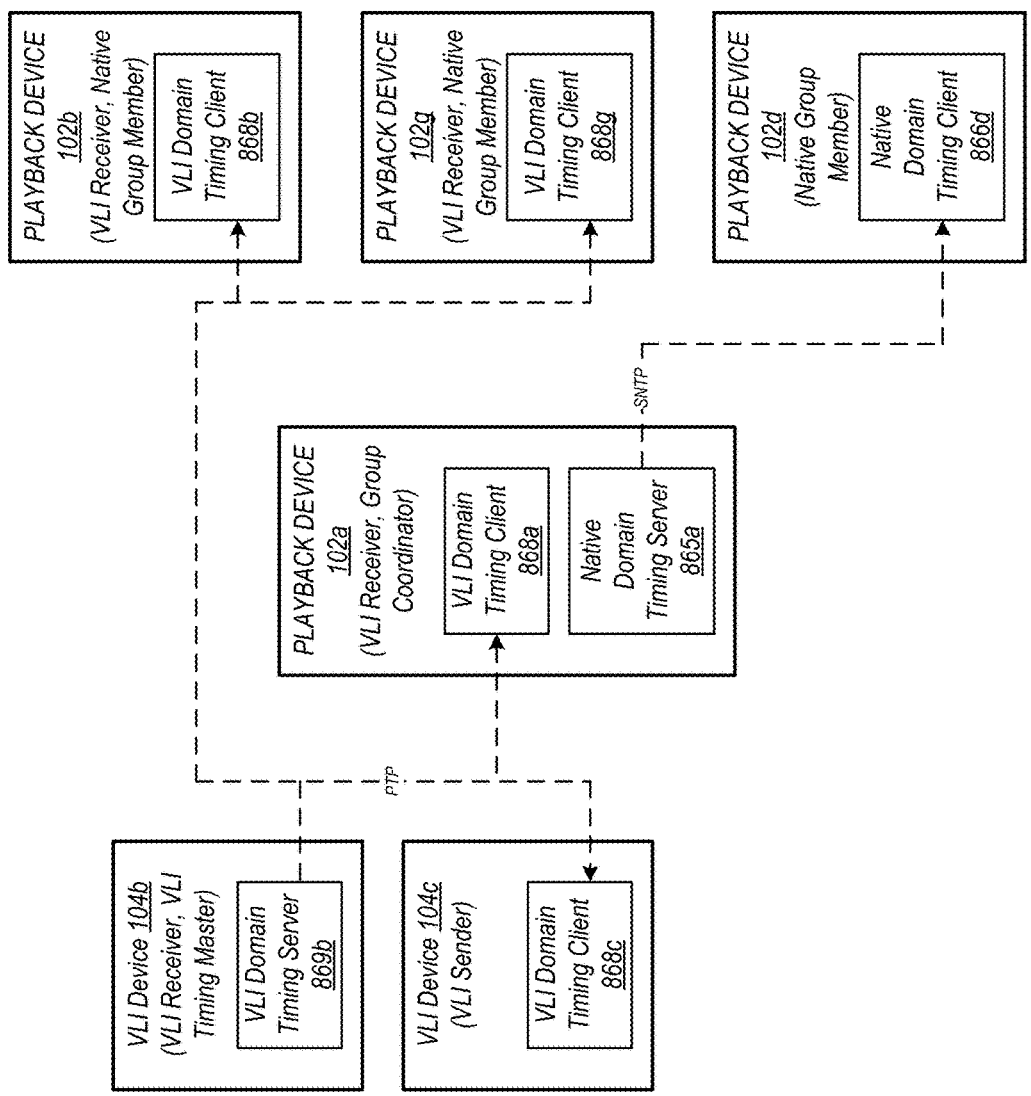

FIG. 9B shows another simplified functional block diagram illustrating example timing distribution within VLI and native domain groups. The VLI group includes VLI devices 104b and 104c as a VLI receiver and sender, respectively, as well as playback devices 102a, 102b, and 102g as VLI receivers. In addition to playback devices 102a, 102b, and 102g, the native domain group includes the playback device 102d, which was added to the native domain group using native domain signaling. As such, the playback device 102d is not a VLI receiver of the VLI group. The playback device 102a is the group coordinator of the native domain group.

In the FIG. 9B example, the VLI device 104b is the VLI timing master. As such, the VLI device 104b distributes VLI timing information to each VLI receiver in the VLI group, which includes the VLI devices 104b and 104c, as well as the playback devices 102a, 102b and 102g. The playback devices 102a, 102b and 102g operating as VLI receivers process the audio from the VLI sender and the VLI domain timing information from the VLI timing master in a similar manner as playback device 102e in the FIG. 8B example.

Moreover, the playback device 102a distributes native domain audio and timing information to the playback device 102d in a similar manner as the playback device 102e and playback device 102h in the FIG. 8B example. The "legacy" playback device 102d can be added to the native domain synchrony group using the native controller 326 (e.g., via playback zone region 543 (FIG. 5B)). In this way, the native playback device 102d can synchronize playback with the VLI group even though the playback device 102d is not a VLI receiver. In other words, native domain group members can synchronize using native domain audio and timing information to a native domain group coordinator that is configured as a VLI receiver.

V. Example Techniques for Improved Interoperability Between VLI and Native Media Playback Systems As indicated above, to facilitate interoperability between the VLI media playback system and the native domain media playback system, a playback device 102 may convert VLI domain control signaling to native domain control signaling and vice versa. However, in some cases, there might not be an equivalent function or command in the VLI domain for each native domain command. Similarly, the VLI media playback system may implement certain operations in different ways.

To illustrate, in one example, the VLI media playback system and native media playback systems implement mute in different ways. For instance, the VLI media playback system implements mute by lowering volume to a pre-determined inaudible volume level (e.g., −144 dB). In contrast, the native media playback system implements "true" mute, whereby it's possible to have a non-zero volume level with mute enabled with the mute state taking precedence over the group volume level. Within examples, either type of mute command mutes all grouped devices.

In a first example, a VLI session starts with the native domain mute set to disabled. If the VLI sender sets the volume level to the pre-determined inaudible volume level using the VLI domain controller 327, the VLI sender transmits VLI commands to each VLI receiver setting the group volume level to the pre-determined inaudible volume level. The VLI device(s) 104 receiving this VLI domain command carry out the command literally, by setting their group volume level to the pre-determined inaudible volume level.

However, if a given playback device 102 (operating as a VLI receiver) receives this VLI domain command, the playback device 102 does not carry out the command literally. Instead, the playback device 102 enables the native domain mute, stores the current native domain volume level, and sets the native domain volume to zero. Enabling the native domain mute has the side effective of also muting any playback device 102 in a native domain group with the given playback device 102 via the native domain control signaling described above. In addition, storing the current native domain volume level allows the playback device(s) 102 to re-establish the same pre-mute volume level when mute is disabled. Yet further, setting the native domain volume to zero cause the volume slider of any native domain controller 327 to match the volume control of the VLI domain control app 328.

If the given playback device 102 (operating as a VLI receiver) receives a native domain mute command, the playback device 102 does not carry out the command literally. Instead, the playback device 102 sends a proxied volume control command (as discussed in section III for instance) to set the volume level to the pre-determined inaudible volume level. Upon receiving this command, the VLI sender relays this command back to the playback device 102. In response, the playback device 102 enables the native domain mute, stores the current native domain volume level, and sets the native domain volume to zero, in the same manner as described above.

While in the VLI domain mute state, the playback device 102 may receive VLI or native domain commands to change the group volume level to a non-zero level. If the playback device 102 receives a native domain command to set the volume to a given level (e.g., via a volume slider of the native controller 327 or volume button on the playback device 102), the playback device 102 disables the native domain mute state and sets the native domain volume level to the given level. If the playback device 102 receives a VLI domain command to set the volume to a given level (e.g., via a volume slider of the VLI control controller 428), the playback device 102 disables the native domain mute state and sets the native domain volume level to the given level.

In a second example, a VLI session starts with the native domain mute set to enabled. As the VLI session starts, the VLI receivers adjust to the volume level set by the VLI sender. Unless this volume level is the pre-determined inaudible volume level, the playback device 102 disables the native domain mute and sets the native domain volume level to the given level. If the playback device 102 receives a native domain command to disable mute, the playback device 102 disables the native domain mute and keeps the native domain volume level at the volume level set by the VLI sender. If the playback device 102 receives a VLI domain command to set the group volume level to a non-zero volume level, the playback device 102 disables the native domain mute and sets the native domain volume level to the non-zero volume level.

If the VLI session ends with the native domain mute enabled, the playback device 102 retains the current native domain mute state and native domain volume level.

VI. Example Methods

Figure 10:
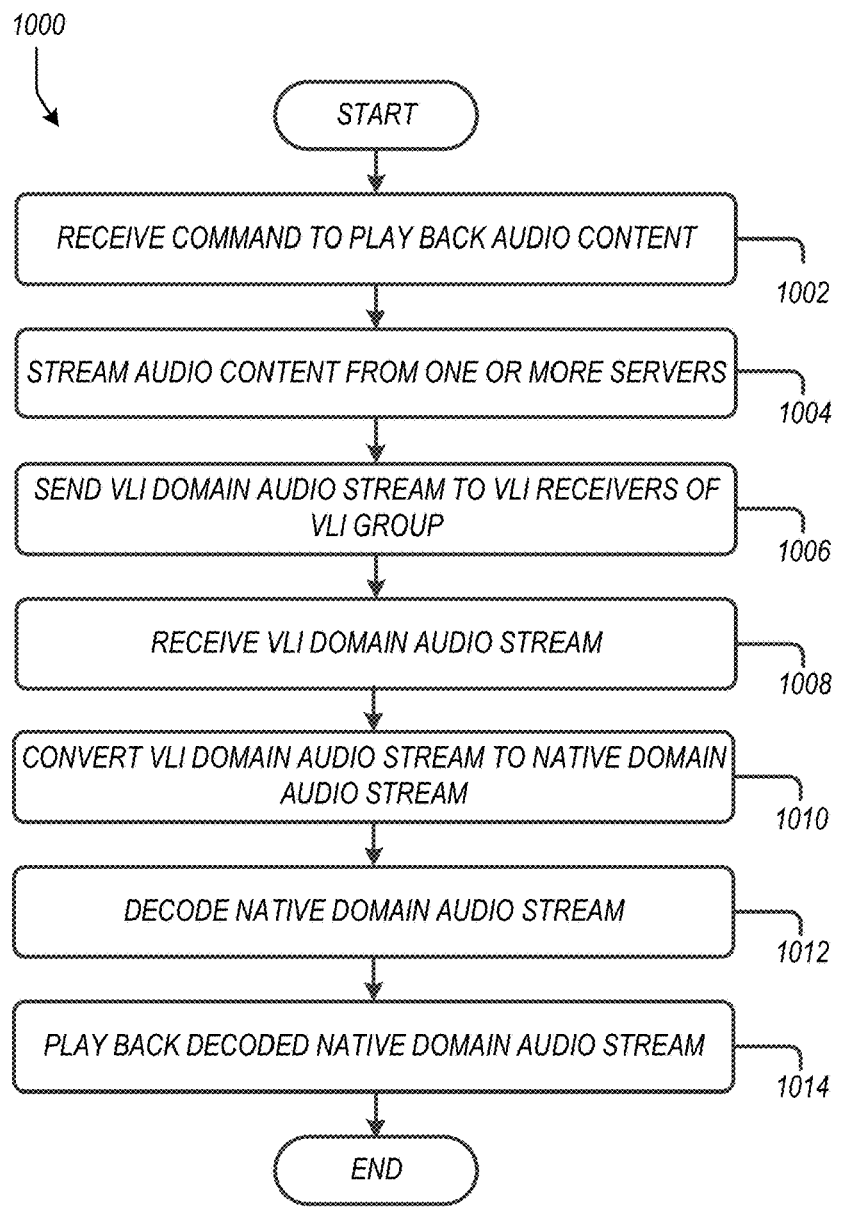
FIG. 10 shows a technique to distribute control and audio signals with VLI and native domain groups, according to example implementations.
Figure 11:
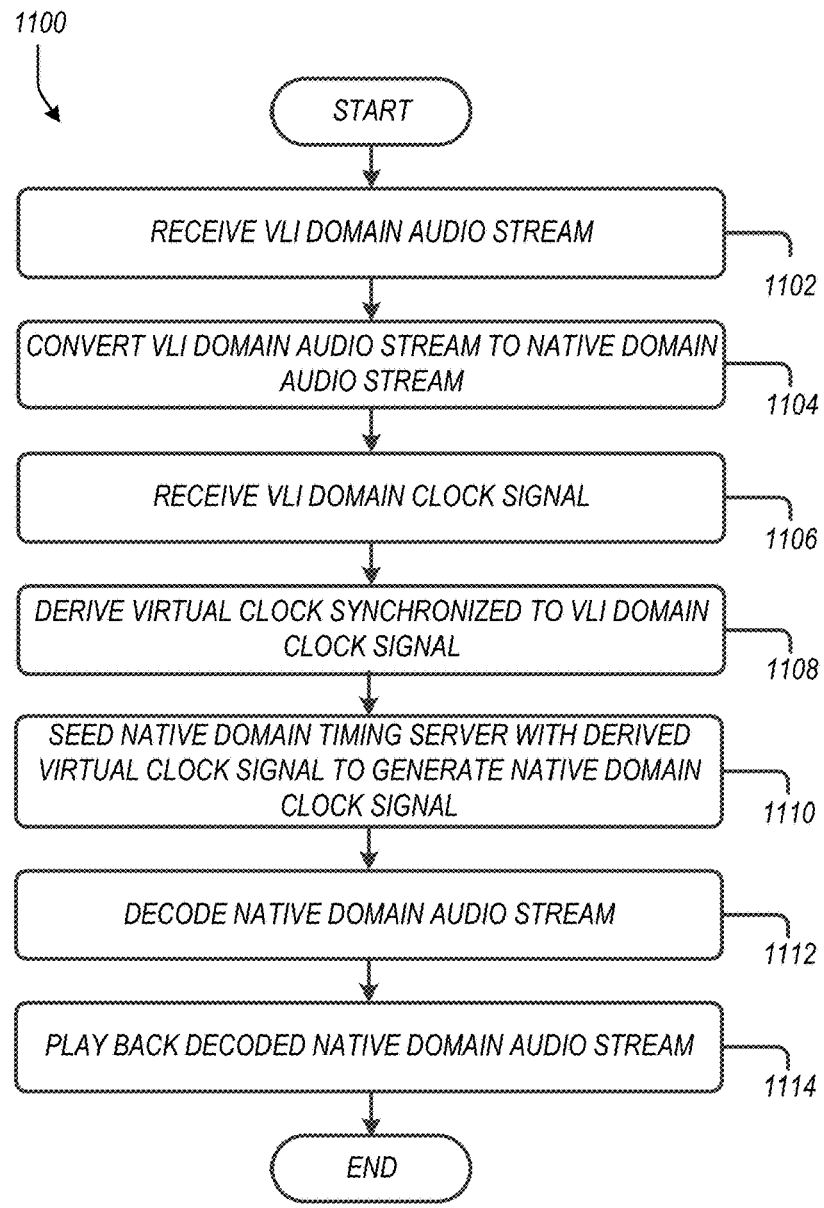
FIG. 11 shows a technique to distribute timing signals with VLI and native domain groups, according to example implementations.

Implementations 1000 and 1100 shown in FIGS. 10 and 11, respectively present example embodiments of techniques described herein. These example embodiments that can be implemented within an operating environment including, for example, the media playback system 100 of FIG. 1, one or more of the playback device 200 of FIG. 2, one or more of the control device 300 of FIG. 3, one or more of the VLI devices of FIG. 4, as well as other devices described herein and/or other suitable devices. Further, operations illustrated by way of example as being performed by a media playback system can be performed by any suitable device, such as a playback device or a control device of a media playback system. Implementation 1000 and 1100 may include one or more operations, functions, or actions as illustrated by one or more of blocks shown in FIGS. 10 and 11. Although the blocks are illustrated in sequential order, these blocks may also be performed in parallel, and/or in a different order than those described herein. Also, the various blocks may be combined into fewer blocks, divided into additional blocks, and/or removed based upon the desired implementation.

In addition, for the implementations disclosed herein, the flowcharts show functionality and operation of one possible implementation of present embodiments. In this regard, each block may represent a module, a segment, or a portion of program code, which includes one or more instructions executable by a processor for implementing specific logical functions or steps in the process. The program code may be stored on any type of computer readable medium, for example, such as a storage device including a disk or hard drive. The computer readable medium may include non-transitory computer readable medium, for example, such as computer-readable media that stores data for short periods of time like register memory, processor cache, and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, for example, or a tangible storage device. In addition, for the implementations disclosed herein, each block may represent circuitry that is wired to perform the specific logical functions in the process.

a. Example Methods for VLI Group Control and Audio Distribution

As discussed above, embodiments described herein involve VLI group control and audio distribution. FIG. 10 illustrates an example implementation 1000 of a method by which a system distributes control and audio signals within a VLI and native groups.

At block 1002, the implementation 1000 involves receiving a command to play back audio content. For instance, a first VLI device 104 configured as a VLI sender of a VLI group may receive, via an input interface of the first VLI device, a command to play back audio content. To illustrate, referring back to FIG. 7A, the VLI device 104 is configured as a VLI sender of a VLI group and may receive a command to play back audio content via the VLI controller 428.

Alternatively, the VLI device 104 may receive the command to play back audio content via a VUI. In such examples, the VLI device 104 may receive, via a microphone array, a voice command to play back the audio content. The voice command may also select the devices in the VLI group by referring to certain VLI devices 104 or native playback devices 102 by reference to their name (e.g., a zone name, such as "Kitchen" or "Living Room").

In some examples, the command to play back audio content may also create a VLI session. Creating a VLI session may involve selecting one or more VLI devices 104 and/or native playback devices 102 and selecting audio content for the VLI group to play back. In some implementations, the VLI device 104 receiving the command to play back audio content becomes the VLI sender of the VLI group. That is, the particular VLI device 104 receiving the command starts the VLI session and accordingly becomes the VLI sender of the VLI group. Other selected devices are then configured as VLI receivers of the VLI group.

At block 1004, the implementation 1000 involves streaming the audio content from one or more servers. For example, the first VLI device 104 may stream, via a network interface of the first VLI device, streaming the audio content from one or more servers, such as one or more servers of a streaming audio service or from an audio server on the VLI device 104 itself.

At block 1006, the implementation 1000 involves sending a VLI domain audio stream representing the streamed audio content to one or more VLI receivers of the VLI group. For instance, the VLI device 104 may send, via the network interface of the first VLI device, a VLI domain audio stream representing the streamed audio content to one or more VLI receivers of the VLI group. To illustrate, in FIG. 7A, the VLI device 104 sends a VLI domain audio stream to the playback device 102e as VLI sender. As another example, in FIG. 7D, the VLI device 104a sends a VLI domain audio stream to playback devices 102e and 102h.

At block 1008, the implementation 1000 involves receiving the VLI domain audio stream representing the streamed audio content. For example, a first native playback device configured as a first VLI receiver of the VLI group may receive, via a network interface of the first native playback device, the VLI domain audio stream representing the streamed audio content.

At block 1010, the implementation 1000 involves converting the VLI domain audio stream to a native domain audio stream. For instance, the first native playback device may convert, via one or more processors, the VLI domain audio stream from the first VLI device to a native domain audio stream. To illustrate, referring back to FIG. 7A, the playback device 102e may convert the VLI domain audio stream from the VLI device 104. The playback device 102e may perform such a conversion using the virtual line-in 750e, among other examples.

At block 1012, the implementation 1000 involves decoding the native domain audio stream. For example, the first native playback device may decode, via the one or more processors, the native domain audio stream. By way of example, referring back to FIG. 7A, the playback device 102e may decode the native domain audio stream. As one example, the playback device 102e may perform such decoding using the channel sink 863e.

At block 1014, the implementation 1000 involves playing back the decoded native domain audio stream. The first native playback device may play back the decoded native domain audio stream via an audio stage that includes one or more amplifiers (e.g., audio amplifier(s) 220 of the playback device 102 shown in FIG. 2) that drive one or more speakers (e.g., speaker(s) 222 shown in FIG. 2).

The first native playback device may perform additional functions in various roles as a VLI receiver and/or native domain group coordinator. For instance, the first native playback device may extract metadata associated with the streamed audio content from the VLI domain audio stream. As a VLI receiver, the first native playback device may use this extracted metadata to provide information about the audio content in the VLI domain audio stream to VLI control interfaces.

As the native domain group coordinator, the first native playback device may send, or otherwise distribute, native domain signaling representing the extracted metadata to one or more native domain control devices. For instance, referring back to FIG. 7A, the playback device 103e may send native domain signaling representing the extracted metadata to the control device 103. Upon receiving such native domain signaling, the control device 103 may update the native controller 327 to display an indication of the metadata. For example, the control device 103 may update control interfaces such controller interfaces 526a and 526b in FIGS. 5A and 5B, respectively, to provide information on the currently playing audio content by way of the extracted metadata.

In some instances, the native control device 103 sends native domain playback commands to the first native playback device when user input is provided to the native control device 103 (e.g., via the native controller 327). When the first native playback device receives a native domain playback command, the first native playback device might not carry out that command. Instead, the first native playback device may convert the native domain playback command to a corresponding VLI domain instruction and send the VLI domain instruction to the first VLI device. For instance, referring again to FIG. 7A, when the playback device 103e receives a native domain playback command from the native control device 103, the playback device 103e converts that native domain playback command to a corresponding VLI domain instruction and sends the VLI domain instruction to the VLI device 104 (i.e., the VLI sender). Then, the VLI device 104, as the VLI sender, based on the VLI domain instruction, causes the VLI group (including the first native playback device as a VLI receiver) to carry out a VLI domain playback command corresponding to the native domain playback command. As noted above, example playback commands in both the VLI and native domains include transport control (e.g., play/pause, skip forward/backward, fast forward/rewind, stop, etc.) and volume control (e.g., volume up/down and mute).

In an example, the native domain playback command is a particular native domain playback command that, when carried out by the VLI group, causes the VLI group to play back a second audio track. Such a command might be a skip forward or backward, or a command to play the second audio track (e.g., a selection of the second audio track from a queue or playlist). In such an example, the first VLI device (e.g., VLI device 104) may carry out the VLI domain playback command corresponding to the native domain playback command by streaming, via the network interface of the first VLI device, the second audio track from the one or more servers and sending, via the network interface of the first VLI device, a VLI domain audio stream representing the second audio track to the first native playback device to the VLI receivers of the VLI group.

The first native playback device (as a VLI receiver) then receives the VLI domain audio stream representing the second audio track. Then, the first native playback device converts the VLI domain audio stream representing the second audio track to a native domain audio stream representing the second audio track. The first native playback device then handles the converted audio stream as it would any native domain audio stream. As described above, the first native playback device decodes the native domain audio stream representing the second audio track and plays back the decoded native domain audio stream via its audio stage.

In another example, the native domain playback command is a particular native domain playback command that, when carried out by the VLI group, causes the VLI group to adjust volume (e.g., a volume up/down or mute command). In this example, the first VLI device (e.g., VLI device 104) may carry out the VLI domain playback command corresponding to the native domain playback command by sending the VLI domain playback command to one or more VLI receivers of the VLI group. The VLI receivers (e.g., the first native playback device) receive this VLI domain playback command and adjust volume according to the VLI domain playback command.

In some examples, the VLI group includes a second VLI receiver, which may be a second VLI device or a second native playback device. For instance, the playback device 102b in FIG. 9A is an example of a second native playback device configured as a second VLI receiver and the VLI device 104e is an example of a second VLI device configured as a second VLI receiver. In each case, the second VLI receiver receives the VLI domain audio stream representing the streamed audio content from the VLI sender. The second native playback device converts the VLI domain audio stream to the native domain audio stream and then decodes and plays back the native domain audio stream. In contrast, the second VLI device decodes and plays back the VLI domain audio stream. In each case, the playback is in synchrony with the other VLI receivers.

When the first native playback device is a native domain group coordinator of a native domain synchrony group that includes a second native playback device configured as a native domain group member, the first native playback device may perform certain functions to facilitate concurrent synchronous playback by the VLI group and the native domain synchrony group. For instance, the native domain group coordinator may distribute the native domain audio stream to one or more native domain group members for playback by the one or more native domain group members. In addition, the native domain group coordinator may convert the VLI domain playback commands to corresponding native domain playback commands and distribute the native domain playback command to the native domain group member(s) of the native domain synchrony group. Since the native domain group member(s) are not part of the VLI group, such functions facilitate the native domain group member(s) performing playback in the same way as the VLI group members. As an example, in FIG. 7D, the playback device 102e is a native domain group coordinator of a native domain synchrony group that includes the playback device 102f as a group member.

Within examples, the first native playback device need not be the native domain group coordinator and a second native playback device can instead be configured as the native domain group coordinator. For instance, referring to FIG. 7C, the playback device 102h is configured as the group coordinator of a native domain synchrony group that includes the playback device 102f as a native domain group member. Notably, the playback device 102h is not configured as a VLI receiver. The playback device 102h receives the native domain audio stream from the playback device 102e, which is configured as a VLI receiver.

In further examples, the first VLI device is configured as a VLI receiver in addition to a VLI sender. As VLI receiver, the first VLI device plays back the audio content in synchrony with the other VLI receivers. In particular, the first VLI device decodes the VLI domain audio stream and plays back the decoded VLI domain audio stream in synchrony with the first native playback device via an audio stage of the first VLI device.

b. Example Methods for VLI Group Timing

As discussed above, embodiments described herein involve VLI group timing to facilitate synchronization of audio playback with native playback devices. FIG. 11 illustrates an example implementation 1100 of a method by which a system distributes control and audio signals within a VLI and native groups.

At block 1102, the implementation 1100 involves receiving a VLI domain audio stream representing audio content. For instance, a first native playback device configured as a VLI receiver of a VLI group may receive a VLI domain audio stream from a VLI sender of the VLI group. An example first native playback device is the playback device 102e shown in FIGS. 8B and 8C and an example VLI sender is the VLI device 104 also shown in FIGS. 8B and 8C.

The VLI sender may receive one or more commands to play back the audio content (and possibly to start a VLI session and to form a VLI group that includes the first native playback device) via a VUI control interface. Based on these command(s), the VLI sender streams the audio content from one or more servers and sends a VLI domain audio stream representing the audio content to one or more VLI receivers of the VLI group. The first native playback device, as a VLI receiver of the VLI group, receives this VLI domain audio stream.

At block 1104, the implementation 1100 involves converting the VLI domain audio stream to a native domain audio stream. For instance, the first native playback device may convert, via one or more processors, the VLI domain audio stream from the first VLI device to a native domain audio stream. To illustrate, referring to FIG. 8B, the playback device 102e may convert the VLI domain audio stream from the VLI device 104 to the native domain audio stream at a rate set by a device clock of the first native playback device. Example device clocks include the CPU clock 859e and DAC clock 860e. The playback device 102e may perform such a conversion using the virtual line-in 862e, among other examples.

At block 1106, the implementation 1100 involves receiving a VLI domain clock signal. In some implementations, the first native playback device receives the VLI domain clock signal from a VLI domain timing server on a VLI device 104 such as the VLI sender. An example of this configuration is shown in FIG. 8B. Alternatively, the first native playback device receives the VLI domain clock signal from a VLI domain timing server on the first native playback device. An example of this implementation is shown in FIG. 8C.

Within examples, the VLI group may select a VLI domain timing master to implement the VLI domain server. In an example implementation, the VLI source is selected as the VLI domain timing master when the VLI source is powered by an external AC power source. However, when the VLI source is powered by an internal battery, the VLI group may select an externally powered VLI receiver, such as the first native playback device or another VLI device 104 configured as a VLI receiver. This hierarchy avoids relatively high power usage (and associated battery drain) that results from implementing a VLI domain timing server and distributing the VLI domain clock signal to VLI group members.

At block 1108, the implementation 1100 involves deriving a virtual clock signal synchronized to the VLI domain clock signal. The first native playback device may derive the virtual clock signal based on a skew signal representing the error between the device clock and the VLI domain clock signal. For example, referring again to FIG. 8B, the playback device 102e may generates a skew signal representing the error between the CPU clock 859e and the VLI domain clock signal from the VLI device 104 (which the audio input 862e receives from the VLI domain timing server 869). The skew signal may represent a number of audio samples that CPU clock 859e is ahead of or behind the VLI domain clock. For instance, consecutive elements of the skew signal might be +3 samples, −2 samples, −1 samples, +2 samples.

The virtual clock 870e uses the difference between the CPU clock 859e and the VLI domain clock signal represented by the skew signal to derive a virtual clock signal synchronized to the VLI domain master clock. For instance, the virtual clock 870e may discipline the device clock with the skew signal to generate the virtual clock signal synchronized to the VLI domain clock signal. As shown in FIG. 8B, the virtual clock 870e disciplines the CPU clock 859e with the skew signal to generate the virtual clock signal.

At block 1110, the implementation 1100 involves seeding a native domain timing server with the derived virtual clock signal. For example, the first native playback device may provide the derived virtual clock signal as a seed to a native domain timing server to generate a native domain clock signal synchronized to the VLI domain clock signal. To illustrate, referring again to FIG. 8B, the playback device 103e provides the virtual clock 870e as a seed to the native domain timing server 865e.

During native operation, by contrast, the seed to the native domain timing server 865e is the device clock (e.g., the CPU clock 859e or the DAC clock 860e). As such, when the VLI group is formed, the first native playback device may switch the seed of the native domain timing server from the device clock to the derived virtual clock signal. Likewise, when the VLI session ends (and the first native playback device is removed from the VLI group), the first native device switches the seed of the native domain timing server from the derived virtual clock signal to the device clock.

At block 1112, the implementation 1000 involves decoding the native domain audio stream. For instance, the first native playback device may decode, via the one or more processors, the native domain audio stream at a rate set by the native domain clock signal. Since the native domain clock signal is synchronized to the VLI domain clock signal, the first native playback device decodes the native domain audio stream at in synchrony with other VLI receivers. By way of example, referring again to FIG. 8B, the channel sink 863e decodes the native domain audio stream from the audio input 862e.

The first native playback device may decode the native domain audio stream at the rate set by the native domain clock signal in several different ways. In some examples, the first native playback device disciplines a digital-to-audio converter clock to the native domain clock signal synchronized to the VLI domain clock signal. In other words, as shown in FIG. 8B, the VCXO of the sync 867e uses the native domain clock signal to "discipline" the DAC clock 860e of the playback device 102e by speeding it up or slowing it down to match the native domain clock signal. Alternatively, the first native playback device may insert or remove samples from the native domain audio stream using the native domain clock signal to cause a playback rate of the first native playback device to match VLI domain clock signal. For example, the AsyncSRC of the sync 867e uses the native domain clock signal to cause the channel sink 863e logically insert or remove samples from the audio stream in order for its playback rate to match that of other VLI group members.

At block 1114, the implementation 1000 involves playing back the decoded native domain audio stream. The first native playback device may play back the decoded native domain audio stream via an audio stage that includes one or more amplifiers (e.g., audio amplifier(s) 220 of the playback device 102 shown in FIG. 2) that drive one or more speakers (e.g., speaker(s) 222 shown in FIG. 2).

The first native playback device may also be configured as a native domain group coordinator of a native domain synchrony group. In such examples, if the native domain synchrony group includes one or more native domain group members, the first native playback device distributes, to the one or more native domain group members, the native domain audio stream and the native domain clock signal synchronized to the VLI domain clock signal. An example of this is shown in FIG. 8B, where the playback device 102e distributes the native domain audio stream and the native domain clock signal to the playback device 102h.

A second native playback device configured as a native domain group member of the native domain synchrony group may perform functions to facilitate synchronous playback with the native domain group coordinator. For instance, the second native playback device may receive the native domain audio stream and the native domain clock signal. The second native playback device may then decode the native domain audio stream at a rate set by the native domain clock signal and play back the decoded native domain audio stream in synchrony with the first native playback device.

In further examples, a second native playback device may be configured as a second VLI receiver of the VLI group. In such examples, the second native playback device performs similar functions as the first native playback device. That is, as the second VLI receiver, the second native playback device, receives the VLI domain audio stream and converts the VLI domain audio stream to a second native domain audio stream at a rate set by a device clock of the second native playback device. The second native playback device also receives the VLI domain clock signal from the VLI domain timing server, derives its own virtual clock signal synchronized to the VLI domain clock signal, and seeds its native domain timing server with that virtual clock. Then, the second native playback device decodes the native domain audio stream at a rate set by the second native domain clock signal and plays back the decoded native domain audio stream in synchrony with the first native playback device. An example of a second native playback device configured as a VLI receiver is the playback device 102b of FIG. 9A.

In some examples, the VLI group includes a second VLI device configured as a VLI receiver. For instance, referring still to FIG. 9A, the VLI device 104e is configured as a VLI receiver of the VLI group. As the VLI receiver of the VLI group, the VLI device 104e receives the VLI domain audio stream representing the streamed audio content and the VLI domain clock signal. The VLI device 104e decodes the VLI domain audio stream at the rate set by the VLI domain clock signal and plays back the decoded VLI domain audio stream in synchrony with the other VLI receivers.

In some cases, the first VLI device is configured as a VLI receiver in addition to the VLI sender. In such examples, to facilitate synchronous playback with the other VLI receivers, the first VLI device decodes the VLI domain audio stream at the rate set by the VLI domain clock signal and plays back the decoded VLI domain audio stream in synchrony with the other VLI receivers. The first VLI device may receive the VLI domain clock signal from the first native playback device (as illustrated in FIG. 9A) or an internal VLI domain timing server (as demonstrated in FIG. 9B).

VII. Conclusion

The description above discloses, among other things, various example systems, methods, apparatus, and articles of manufacture including, among other components, firmware and/or software executed on hardware. It is understood that such examples are merely illustrative and should not be considered as limiting. For example, it is contemplated that any or all of the firmware, hardware, and/or software aspects or components can be embodied exclusively in hardware, exclusively in software, exclusively in firmware, or in any combination of hardware, software, and/or firmware. Accordingly, the examples provided are not the only way(s) to implement such systems, methods, apparatus, and/or articles of manufacture.

(Feature 1) A method to be performed by one or more devices of a VLI group comprising a first native playback device configured as a first Virtual Line In (VLI) receiver of the VLI group, wherein the VLI group is configured to (i) receive via an input interface of a first VLI device, a command to play back audio content and (ii) send, via a network interface of the first VLI device, a VLI domain audio stream representing the audio content to one or more VLI receivers of the VLI group, and wherein the method comprises receiving, via a network interface of the first native playback device, a VLI domain audio stream representing the audio content; converting, via one or more processors, the VLI domain audio stream to a native domain audio stream at a rate set by a device clock of the first native playback device; receiving, from a VLI domain timing server, a VLI domain clock signal; deriving a virtual clock signal synchronized to the VLI domain clock signal; providing the derived virtual clock signal as a seed to a native domain timing server to generate a native domain clock signal synchronized to the VLI domain clock signal; decoding, via the one or more processors, the native domain audio stream at a rate set by the native domain clock signal; and playing back the decoded native domain audio stream via an audio stage of the first native playback device, the audio stage of the first native playback device comprising one or more amplifiers that drive one or more speakers.

(Feature 2) The method of feature 1, further comprising selecting a VLI domain timing master to implement the VLI domain timing server, wherein the VLI source is selected as the VLI domain timing master when the VLI source is powered by an external AC power source; and wherein the first VLI receiver is selected as the VLI domain timing master when the VLI source is powered by an internal battery.

(Feature 3) The method of feature 1, wherein the first native playback device is configured as a native domain group coordinator of a native domain synchrony group to perform further functions of the method comprising: distributing, to one or more native domain group members, (i) the native domain audio stream and (ii) the native domain clock signal synchronized to the VLI domain clock signal, and wherein a second native playback device is configured as a native domain group member of a native domain synchrony group to perform functions of the method comprising receiving the native domain audio stream and the native domain clock signal synchronized to the VLI domain clock signal; decoding, via one or more processors of the second native playback device, the native domain audio stream at a rate set by the native domain clock signal; and playing back the decoded native domain audio stream via an audio stage of the second native playback device in synchrony with the first native playback device, the audio stage of the second native playback device comprising one or more amplifiers that drive one or more speakers.

(Feature 4) The method of feature 1, wherein deriving the virtual clock signal synchronized to the VLI domain clock signal comprises generating a skew signal representing error between the device clock of the first native playback device and the VLI domain clock signal; and generating the virtual clock signal synchronized to the VLI domain clock signal from the device clock and the skew signal.

(Feature 5) The method of feature 1, wherein decoding the native domain audio stream at the rate set by the native domain clock signal comprises disciplining a digital-to-audio converter clock to the native domain clock signal synchronized to the VLI domain clock signal.

(Feature 6) The method of feature 1, wherein decoding the native domain audio stream at the rate set by the native domain clock signal comprises inserting or removing samples from the native domain audio stream using the native domain clock signal to cause a playback rate of the first native playback device to match VLI domain clock signal.

(Feature 7) The method of feature 1, wherein providing the derived virtual clock signal as the seed to the native domain timing server comprises switching the seed of the native domain timing server from the device clock to the derived virtual clock signal when the VLI group initiates playback.

(Feature 8) The method of feature 7, further comprising switching the seed of the native domain timing server from the derived virtual clock signal to the device clock when the VLI group is terminated.

(Feature 9) The method of feature 1, wherein a second native playback device is configured as a second VLI receiver of the VLI group to perform functions of the method comprising receiving, via a network interface of the second native playback device, the VLI domain audio stream representing the audio content; converting, via one or more processors, the VLI domain audio stream to a second native domain audio stream at a rate set by a device clock of the second native playback device; receiving, from the VLI domain timing server, the VLI domain clock signal; deriving a second virtual clock signal synchronized to the VLI domain clock signal; providing the derived second virtual clock signal as a seed to a native domain timing server of the second native playback device to generate a second native domain clock signal synchronized to the VLI domain clock signal; decoding, via the one or more processors, the native domain audio stream at a rate set by the second native domain clock signal; and playing back the decoded native domain audio stream in synchrony with the first native playback device via an audio stage of the second native playback device, the audio stage of the second native playback device comprising one or more amplifiers that drive one or more speakers.

(Feature 10) The method of feature 1, wherein a second VLI device configured as a second VLI receiver of the VLI group to perform functions of the method comprising receiving, via a network interface of the second VLI device, (i) the VLI domain audio stream representing the streamed audio content and (ii) the VLI domain clock signal; decoding the VLI domain audio stream at the rate set by the VLI domain clock signal; and playing back the decoded VLI domain audio stream in synchrony with the first native playback device via an audio stage of the second VLI device, the audio stage of the second VLI device comprising one or more amplifiers that drive one or more speakers.

(Feature 11) The method of feature 1, wherein the input interface of the first VLI device comprises a touch-sensitive graphical display, and wherein receiving the command to play back audio content comprises: displaying, on the touch-sensitive graphical display, a user interface of a VLI control application, the user interface including controls to select audio content for playback and controls to select a playback device; and receiving, via the user interface of the VLI control application, input data representing selection of the audio content for playback and selection of the first native playback device, wherein selection of the audio content for playback on the first VLI device configures the first VLI device as the VLI source of the VLI group and wherein selection of the first native playback device causes the first VLI device to configure the first native playback device as the first VLI receiver of the VLI group.

(Feature 12) The method of feature 1, wherein the first VLI device is configured as a second VLI receiver of the VLI group to perform functions of the method comprising: receiving the VLI domain clock signal; decoding the VLI domain audio stream at the rate set by the VLI domain clock signal; and playing back the decoded VLI domain audio stream in synchrony with the first native playback device via an audio stage of the first VLI device, the audio stage of the first VLI device comprising one or more amplifiers that drive one or more speakers.

(Feature 13) The method of feature 12, wherein the input interface of the first VLI device comprises a microphone array, and wherein receiving the command to play back audio content comprises: receiving, via the microphone array, a voice command to play back the audio content on the first VLI device and the first native playback device; and in response to the voice command, configuring the first VLI device as the VLI source of the VLI group and the first native playback device as the first VLI receiver of the VLI group.

(Feature 14) A system configured to perform the method of any of features 1-13.

(Feature 15) A tangible, non-transitory computer-readable medium having stored therein instructions executable by one or more processors to cause a device to perform the method of any of features 1-13.

(Feature 16) A playback device configured to perform the method of any of features 1-13.

(Feature 17) A method to be performed by a first VLI device configured as a VLI source of a VLI group and a first native playback device configured as a first VLI receiver of the VLI group, the method comprising the first VLI device receiving, via an input interface of the first VLI device, a command to play back audio content; streaming, via a network interface of the first VLI device, the audio content from one or more servers; and sending, via the network interface of the first VLI device, a VLI domain audio stream representing the streamed audio content to one or more VLI receivers of the VLI group. The method further comprising the first native playback device receiving, via a network interface of the first native playback device, the VLI domain audio stream representing the streamed audio content; converting, via one or more processors, the VLI domain audio stream to a native domain audio stream; decoding, via the one or more processors, the native domain audio stream; and playing back the decoded native domain audio stream via an audio stage of the first native playback device, the audio stage of the first native playback device comprising one or more amplifiers that drive one or more speakers.

(Feature 18) The method of feature 17, further comprising the first native playback device receiving metadata associated with the streamed audio content from (a) the VLI domain audio stream or (b) a VLI domain data stream and sending, via the network interface of the first native playback device to one or more native domain control devices, native domain signaling representing the extracted metadata. The method further comprising one or more native domain control devices receiving, via respective network interfaces of the one or more native domain control devices, the native domain signaling representing the received metadata and displaying, in respective native domain control applications, the received metadata.

(Feature 19) The method of feature 17, further comprising while playing back a first audio track of the decoded native domain audio stream, receiving a native domain playback command via (a) via the network interface of the first native playback device from a given native domain control device or (b) via a user interface of the first native playback device; converting the native domain playback command to a corresponding VLI domain instruction; and sending, via the network interface of the first native playback device, the VLI domain instruction to the first VLI device. The method further comprising the first VLI device in response to the VLI domain instruction, causing, via the network interface of the first VLI device, the VLI group to carry out a VLI domain playback command corresponding to the native domain playback command.

(Feature 20) The method of feature 19, wherein the native domain playback command is a particular native domain playback command that, when carried out by the VLI group, causes the VLI group to play back a second audio track, and wherein causing the VLI group to carry out the VLI domain playback command corresponding to the native domain playback command comprises: in response to the VLI domain instruction, streaming, via the network interface of the first VLI device, the second audio track from the one or more servers; and sending, via the network interface of the first VLI device, a VLI domain audio stream representing the second audio track to the first native playback device. The method further comprising the first native playback device receiving, via the network interface of the first native playback device, the VLI domain audio stream representing the second audio track; converting, via one or more processors, the VLI domain audio stream representing the second audio track to a native domain audio stream representing the second audio track; decoding the native domain audio stream representing the second audio track; and playing back, via the audio stage of the first native playback device, the decoded native domain audio stream representing the second audio track.

(Feature 21) The method of feature 19, wherein the native domain playback command is a particular native domain playback command that, when carried out by the VLI group, causes the VLI group to adjust volume, and wherein causing the VLI group to carry out the VLI domain playback command corresponding to the native domain playback command comprises: in response to the VLI domain instruction, sending, via the network interface of the first VLI device, the VLI domain playback command to one or more VLI receivers of the VLI group. The method further comprising first native playback device receiving, via the network interface of the first native playback device, the VLI domain playback command; and adjusting volume according to the VLI domain playback command.

(Feature 22) The method of feature 21, further comprising the first native playback device converting, via one or more processors, the VLI domain playback command to a native domain playback command; and distributing the native domain playback command to a native domain group member of a native domain synchrony group.

(Feature 23) The method of feature 17, further comprising a second native playback device receiving, via a network interface of the second native playback device, the VLI domain audio stream representing the streamed audio content; converting, via one or more processors, the VLI domain audio stream to the native domain audio stream; decoding the native domain audio stream; and playing back the decoded native domain audio stream in synchrony with the first native playback device via an audio stage of the second native playback device, the second native playback device comprising one or more amplifiers that drive one or more speakers.

(Feature 24) The method of feature 23, further comprising the first native playback device distributing, via the network interface of the first native playback device, the native domain audio stream to one or more native domain group members. The method further comprising a third native playback device receiving, via a network interface of the third native playback device, the native domain audio stream; decoding the native domain audio stream; and playing back the decoded native domain audio stream in synchrony with the first native playback device and the second native playback device via an audio stage of the second native playback device, the audio stage of the second native playback device comprising one or more amplifiers that drive one or more speakers.

(Feature 25) The method of feature 17, further comprising the first native playback device distributing, via the network interface of the first native playback device, the native domain audio stream to one or more native domain group members. The method further comprising a second native playback device receiving, via a network interface of the second native playback device, the native domain audio stream; decoding the native domain audio stream; and playing back the decoded native domain audio stream in synchrony with the first native playback device via an audio stage of the second native playback device, the audio stage of the second native playback device comprising one or more amplifiers that drive one or more speakers.

(Feature 26) The method of feature 17, further comprising a second native playback device receiving, via a network interface of the second native playback device from the first native playback device, the native domain audio stream; receiving, via a network interface of the second native playback device from the first native playback device, the native domain audio stream; decoding the native domain audio stream; and playing back the decoded native domain audio stream via an audio stage of the second native playback device, the audio stage of the second native playback device comprising one or more amplifiers that drive one or more speakers. The method further comprising a third native playback device receiving, via a network interface of the third native playback device from the second native playback device, the native domain audio stream; decoding the native domain audio stream; and playing back the decoded native domain audio stream in synchrony with the second native playback device via an audio stage of the second native playback device, the audio stage of the second native playback device comprising one or more amplifiers that drive one or more speakers.

(Feature 27) The method of feature 17, further comprising a second VLI device receiving, via a network interface of the second VLI device, the VLI domain audio stream representing the streamed audio content; decoding the VLI domain audio stream; and playing back the decoded VLI domain audio stream in synchrony with the first native playback device via an audio stage of the second VLI device, the audio stage of the second VLI device comprising one or more amplifiers that drive one or more speakers.

(Feature 28) The method of feature 17, wherein the input interface of the first VLI device comprises a touch-sensitive graphical display, and wherein receiving the command to play back audio content comprises: displaying, on the touch-sensitive graphical display, a user interface of a VLI control application, the user interface including controls to select audio content for playback and controls to select a playback device; and receiving, via the user interface of the VLI control application, input data representing selection of the audio content for playback and selection of the first native playback device, wherein selection of the audio content for playback on the first VLI device configures the first VLI device as the VLI source of the VLI group and wherein selection of the first native playback device causes the first VLI device to configure the first native playback device as the first VLI receiver of the VLI group.

(Feature 29) The method of feature 17, further comprising the first VLI device decoding the VLI domain audio stream; and playing back the decoded VLI domain audio stream in synchrony with the first native playback device via an audio stage of the first VLI device, the audio stage of the first VLI device comprising one or more amplifiers that drive one or more speakers.

(Feature 30) The method of feature 29, wherein the input interface of the first VLI device comprises a microphone array, and wherein receiving the command to play back audio content comprises: receiving, via the microphone array, a voice command to play back the audio content on the first VLI device and the first native playback device; and in response to the voice command, configuring the first VLI device as the VLI source of the VLI group and the first native playback device as the first VLI receiver of the VLI group.

(Feature 31) The method of feature 17, wherein the system further comprises a second native playback device, wherein the first native playback device is configured as a native domain group coordinator of a native domain synchrony group to perform functions comprising: detecting that a VLI group ID of the first native playback device matches a VLI group ID of the second native playback device, wherein the second native playback device is configured as a second VLI receiver of the VLI group; and automatically forming a new native domain synchrony group with the second native playback device based on detecting that the VLI group ID of the first native playback device matches the VLI group ID of the second native playback device, wherein automatically forming the native domain synchrony group comprises updating one or more state variables stored on the first native playback device and the second native playback device to indicate that (a) one of the first and second native playback devices is a native domain group coordinator of the new native domain synchrony group and (b) the other one of the first and second native playback devices is a native domain group member of the new native domain synchrony group.

(Feature 32) The method of feature 17, further comprising the first native playback device receiving, via a network interface of the first native playback device, a VLI domain mute command; translating the VLI domain mute command to one or more corresponding first native domain mute commands, wherein the one or more corresponding first native domain mute commands comprise: (i) enabling a native domain mute state on the first native domain playback device, (ii) storing a current native domain volume level of the first native domain playback device, and (iii) setting the native domain volume level to zero; and in response to receiving the VLI domain mute command, carrying out the one or more corresponding first native domain mute commands to perform the mute operation on the first VLI receiver.

(Feature 33) The method of feature 17, wherein the first VLI device comprises the one or more servers.

(Feature 34) A system configured to perform the method of any of features 17-33.

(Feature 35) A tangible, non-transitory computer-readable medium having stored therein instructions executable by one or more processors to cause a device to perform the method of any of features 17-33.

(Feature 36) A playback device configured to perform the method of any of features 17-33.

The specification is presented largely in terms of illustrative environments, systems, procedures, steps, logic blocks, processing, and other symbolic representations that directly or indirectly resemble the operations of data processing devices coupled to networks. These process descriptions and representations are typically used by those skilled in the art to most effectively convey the substance of their work to others skilled in the art. Numerous specific details are set forth to provide a thorough understanding of the present disclosure. However, it is understood to those skilled in the art that certain embodiments of the present disclosure can be practiced without certain, specific details. In other instances, well known methods, procedures, components, and circuitry have not been described in detail to avoid unnecessarily obscuring aspects of the embodiments. Accordingly, the scope of the present disclosure is defined by the appended claims rather than the forgoing description of embodiments.

When any of the appended claims are read to cover a purely software and/or firmware implementation, at least one of the elements in at least one example is hereby expressly defined to include a tangible, non-transitory medium such as a memory, DVD, CD, Blu-ray, and so on, storing the software and/or firmware.

We claim:

1. A system comprising a first native playback device configured as a first Virtual Line In (VLI) receiver of a VLI group, wherein the VLI group is configured to (i) receive via an input interface of a first VLI device, a command to play back audio content and (ii) send, via a network interface of the first VLI device, a VLI domain audio stream representing the audio content to one or more VLI receivers of the VLI group, and wherein the first native playback device is configured to perform functions as the VLI receiver of the VLI group comprising:

receiving, via a network interface of the first native playback device, the VLI domain audio stream representing the audio content;

converting, via one or more processors, the VLI domain audio stream to a native domain audio stream at a rate set by a device clock of the first native playback device;

receiving, from a VLI domain timing server, a VLI domain clock signal;

deriving a virtual clock signal synchronized to the VLI domain clock signal;

providing the derived virtual clock signal as a seed to a native domain timing server to generate a native domain clock signal synchronized to the VLI domain clock signal;

decoding, via the one or more processors, the native domain audio stream at a rate set by the native domain clock signal; and playing back the decoded native domain audio stream.

2. The system of claim 1, wherein the first native playback device is configured as a native domain group coordinator of a native domain synchrony group to perform functions comprising:

distributing, to one or more native domain group members, (i) the native domain audio stream and (ii) the native domain clock signal synchronized to the VLI domain clock signal, wherein the system further comprises a second native playback device configured as a native domain group member of a native domain synchrony group to perform functions comprising:

receiving the native domain audio stream and the native domain clock signal synchronized to the VLI domain clock signal;

decoding, via one or more processors of the second native playback device, the native domain audio stream at a rate set by the native domain clock signal; and playing back the decoded native domain audio stream via an audio stage of the second native playback device in synchrony with the first native playback device.

3. The system of claim 1, wherein deriving the virtual clock signal synchronized to the VLI domain clock signal comprises:

generating a skew signal representing error between the device clock of the first native playback device and the VLI domain clock signal; and generating the virtual clock signal synchronized to the VLI domain clock signal from the device clock and the skew signal.

4. The system of claim 1, wherein decoding the native domain audio stream at the rate set by the native domain clock signal comprises:

disciplining a digital-to-audio converter clock to the native domain clock signal synchronized to the VLI domain clock signal.

5. The system of claim 1, wherein decoding the native domain audio stream at the rate set by the native domain clock signal comprises:

inserting or removing samples from the native domain audio stream using the native domain clock signal to cause a playback rate of the first native playback device to match VLI domain clock signal.

6. The system of claim 1, wherein providing the derived virtual clock signal as the seed to the native domain timing server comprises:

switching the seed of the native domain timing server from the device clock to the derived virtual clock signal when the VLI group initiates playback.

7. The system of claim 6, wherein the first native playback device is configured as a native domain group coordinator of a native domain synchrony group to perform functions comprising:

switching the seed of the native domain timing server from the derived virtual clock signal to the device clock when the VLI group is terminated.

8. The system of claim 1, further comprising a second native playback device, the second native playback device configured as a second VLI receiver of the VLI group to perform functions comprising:

receiving, via a network interface of the second native playback device, the VLI domain audio stream representing the audio content;

converting, via one or more processors, the VLI domain audio stream to a second native domain audio stream at a rate set by a device clock of the second native playback device;

receiving, from the VLI domain timing server, the VLI domain clock signal;

deriving a second virtual clock signal synchronized to the VLI domain clock signal;

providing the derived second virtual clock signal as a seed to a native domain timing server of the second native playback device to generate a second native domain clock signal synchronized to the VLI domain clock signal;

decoding, via the one or more processors, the native domain audio stream at a rate set by the second native domain clock signal; and playing back the decoded native domain audio stream in synchrony with the first native playback device via an audio stage of the second native playback device.

9. The system of claim 1, further comprising a second VLI device, the second VLI device configured as a second VLI receiver of the VLI group to perform functions comprising:

receiving, via a network interface of the second VLI device, (i) the VLI domain audio stream representing the streamed audio content and (ii) the VLI domain clock signal;

decoding the VLI domain audio stream at the rate set by the VLI domain clock signal; and playing back the decoded VLI domain audio stream in synchrony with the first native playback device via an audio stage of the second VLI device.

10. The system of claim 1, wherein the first VLI device is configured as a second VLI receiver of the VLI group to perform functions comprising:

receiving the VLI domain clock signal;

decoding the VLI domain audio stream at the rate set by the VLI domain clock signal; and playing back the decoded VLI domain audio stream in synchrony with the first native playback device via an audio stage of the first VLI device.

11. A method to be performed by a system comprising a first native playback device configured as a first Virtual Line In (VLI) receiver of a VLI group, wherein the VLI group is configured to (i) receive via an input interface of a first VLI device, a command to play back audio content and (ii) send, via a network interface of the first VLI device, a VLI domain audio stream representing the audio content to one or more VLI receivers of the VLI group, and wherein the first native playback device is configured as the VLI receiver of the VLI group to perform steps of the method comprising:

receiving, via a network interface of the first native playback device, the VLI domain audio stream representing the audio content;

converting, via one or more processors, the VLI domain audio stream to a native domain audio stream at a rate set by a device clock of the first native playback device;

receiving, from a VLI domain timing server, a VLI domain clock signal;

deriving a virtual clock signal synchronized to the VLI domain clock signal;

providing the derived virtual clock signal as a seed to a native domain timing server to generate a native domain clock signal synchronized to the VLI domain clock signal;

decoding, via the one or more processors, the native domain audio stream at a rate set by the native domain clock signal; and playing back the decoded native domain audio stream.

12. The method of claim 11, wherein the first native playback device is configured as a native domain group coordinator of a native domain synchrony group to perform steps of the method comprising:

distributing, to one or more native domain group members, (i) the native domain audio stream and (ii) the native domain clock signal synchronized to the VLI domain clock signal, wherein the system further comprises a second native playback device configured as a native domain group member of a native domain synchrony group to perform functions comprising:

receiving the native domain audio stream and the native domain clock signal synchronized to the VLI domain clock signal;

decoding, via one or more processors of the second native playback device, the native domain audio stream at a rate set by the native domain clock signal; and playing back the decoded native domain audio stream via an audio stage of the second native playback device in synchrony with the first native playback device.

13. The method of claim 11, wherein deriving the virtual clock signal synchronized to the VLI domain clock signal comprises:

generating a skew signal representing error between the device clock of the first native playback device and the VLI domain clock signal; and generating the virtual clock signal synchronized to the VLI domain clock signal from the device clock and the skew signal.

14. The method of claim 11, wherein decoding the native domain audio stream at the rate set by the native domain clock signal comprises:

disciplining a digital-to-audio converter clock to the native domain clock signal synchronized to the VLI domain clock signal.

15. The method of claim 11, wherein decoding the native domain audio stream at the rate set by the native domain clock signal comprises:

inserting or removing samples from the native domain audio stream using the native domain clock signal to cause a playback rate of the first native playback device to match VLI domain clock signal.

16. The method of claim 11, wherein providing the derived virtual clock signal as the seed to the native domain timing server comprises:

switching the seed of the native domain timing server from the device clock to the derived virtual clock signal when the VLI group initiates playback.

17. The method of claim 16, wherein the first native playback device is configured as a native domain group coordinator of a native domain synchrony group to perform steps of the method comprising:

switching the seed of the native domain timing server from the derived virtual clock signal to the device clock when the VLI group is terminated.

18. The method of claim 11, wherein the system further comprises a second native playback device, the second native playback device configured as a second VLI receiver of the VLI group to perform steps of the method comprising:

receiving, via a network interface of the second native playback device, the VLI domain audio stream representing the audio content;

converting, via one or more processors, the VLI domain audio stream to a second native domain audio stream at a rate set by a device clock of the second native playback device;

receiving, from the VLI domain timing server, the VLI domain clock signal;

deriving a second virtual clock signal synchronized to the VLI domain clock signal;

providing the derived second virtual clock signal as a seed to a native domain timing server of the second native playback device to generate a second native domain clock signal synchronized to the VLI domain clock signal;

decoding, via the one or more processors, the native domain audio stream at a rate set by the second native domain clock signal; and playing back the decoded native domain audio stream in synchrony with the first native playback device via an audio stage of the second native playback device.

19. The method of claim 11, wherein the system further comprises a second VLI device, the second VLI device configured as a second VLI receiver of the VLI group to perform steps of the method comprising:

receiving, via a network interface of the second VLI device, (i) the VLI domain audio stream representing the streamed audio content and (ii) the VLI domain clock signal;

decoding the VLI domain audio stream at the rate set by the VLI domain clock signal; and playing back the decoded VLI domain audio stream in synchrony with the first native playback device via an audio stage of the second VLI device.

20. The method of claim 11, wherein the first VLI device is configured as a second VLI receiver of the VLI group to perform steps of the method comprising:

receiving the VLI domain clock signal;

decoding the VLI domain audio stream at the rate set by the VLI domain clock signal; and playing back the decoded VLI domain audio stream in synchrony with the first native playback device via an audio stage of the first VLI device.

* * * * *